United States Patent
Fujimoto

[11] Patent Number: 5,982,386
[45] Date of Patent: Nov. 9, 1999

[54] IMAGE BOUNDARY CORRECTION BY FRACTAL PROCESSING

[75] Inventor: Hiroki Fujimoto, Kyoto, Japan

[73] Assignee: Dainippon Screen Mfg. Co., Ltd., Japan

[21] Appl. No.: 08/834,716

[22] Filed: Apr. 1, 1997

[30] Foreign Application Priority Data

Apr. 2, 1996 [JP] Japan ................................. 8-106361
Apr. 18, 1996 [JP] Japan ................................. 8-122422

[51] Int. Cl.⁶ ................................................. G06T 11/00
[52] U.S. Cl. ............................................................. 345/443
[58] Field of Search .............................. 345/441–443, 345/428–430

[56] References Cited

U.S. PATENT DOCUMENTS 4,843,468 6/1989 Drewery .................................. 358/140
5,581,675 12/1996 Shibazaki ................................ 345/431

FOREIGN PATENT DOCUMENTS 61-15471 1/1986 Japan .
1-31232 6/1989 Japan .
7-113964 12/1995 Japan .

OTHER PUBLICATIONS

Mandelbrot, B., "The fractal geometry of nature" *Random Chains and Squig*, Chapter 24, Japanese Version, W.H. Freeman and Company, New York, 1983.

M. Sato, et al., "Pseudo Line–Image Coding and Drawing Method Based on Fractal Theory", The Transactions of the Institute of Electronics, Information and Communication Engineers, vol. J71–D No. 5, pp. 841–848, May 1988.

*Primary Examiner*—Almis R. Jankus
*Attorney, Agent, or Firm*—Ostrolenk, Faber, Gerb & Soffen, LLP

[57] ABSTRACT

At least part of an image boundary is specified as a target boundary portion to be processed and is then subjected to fractal processing. This procedure gives a corrected image boundary. When one cycle of the fractal processing magnifies the target boundary portion by M times, the target boundary portion is contracted to $1/M^N$ (wherein N is an integer of not less than 1) prior to the fractal processing. The fractal processing is recursively executed by N times on the contracted target boundary portion.

17 Claims, 32 Drawing Sheets

|  | r | s | l |
|---|---|---|---|
| DIRECTIONAL VALUES | 0→1<br>1→2<br>2→3<br>3→0 | 0→0<br>1→1<br>2→2<br>3→3 | 0→3<br>1→0<br>2→1<br>3→2 |

⟺ r: CIRCULATION OF +1 (mod4)
s: IDENTITY PERMUTATION
l: CIRCULATION OF -1 (mod4)

(CODE IS ALLOCATED TO EACH UNIT LENGTH.)

DUMMY INITIAL VECTOR DIV

| POINT NUMBER | DIRECTIONAL VALUE OF INPUT VECTOR | DIRECTIONAL VALUE OF OUTPUT VECTOR | CODE |
|---|---|---|---|
| P0 (START) | 0 | 0 | s |
| P1 | 0 | 3 | l |
| P2 | 3 | 0 | r |
| P3 | 0 | 3 | l |
| P4 | 3 | 0 | r |
| P5 | 0 | 0 | s |
| P6 | 0 | 1 | r |

Fig. 18 (A1)         Fig. 18 (A2)
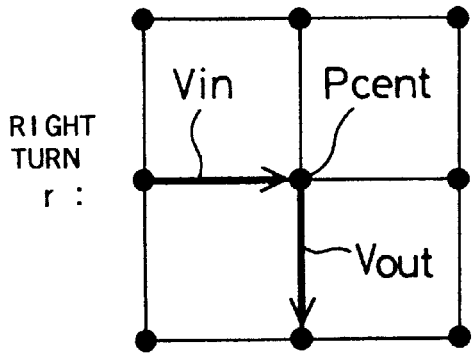 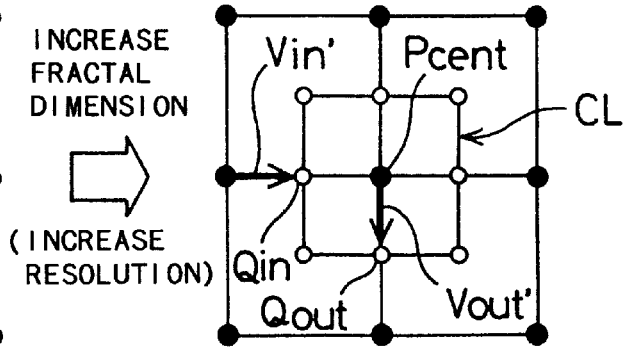
Fig. 18 (B1)         Fig. 18 (B2)
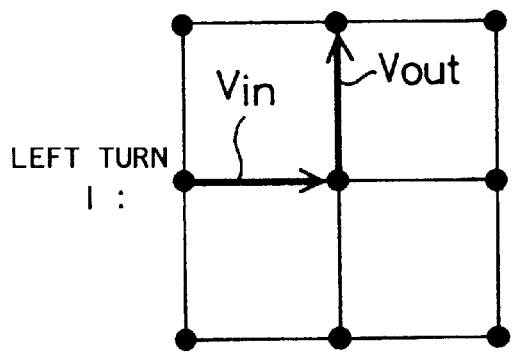 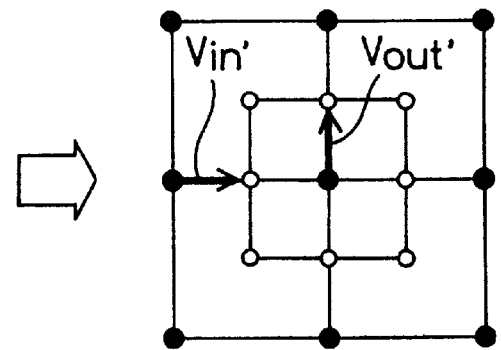
Fig. 18 (C1)         Fig. 18 (C2)
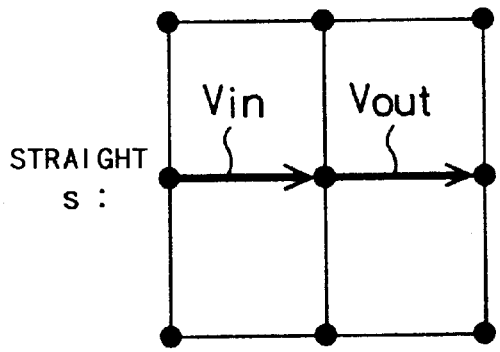 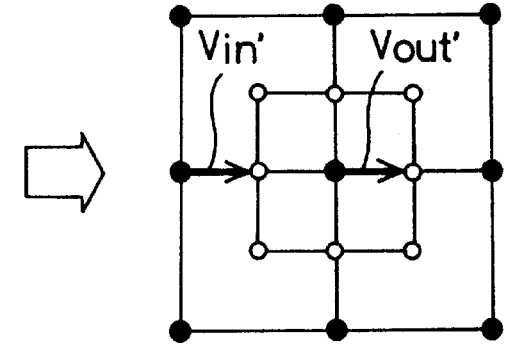

Fig. 19(A1)
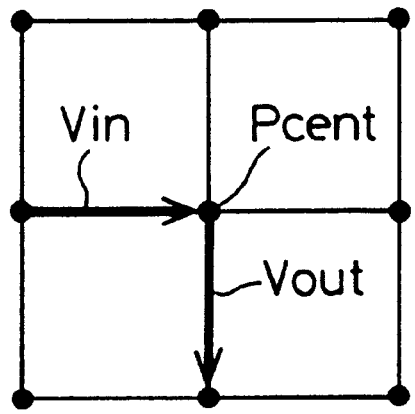
INCREASE FRACTAL DIMENSION
(MAGNIFICATION OF LINE)
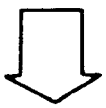
Fig. 19(A2)
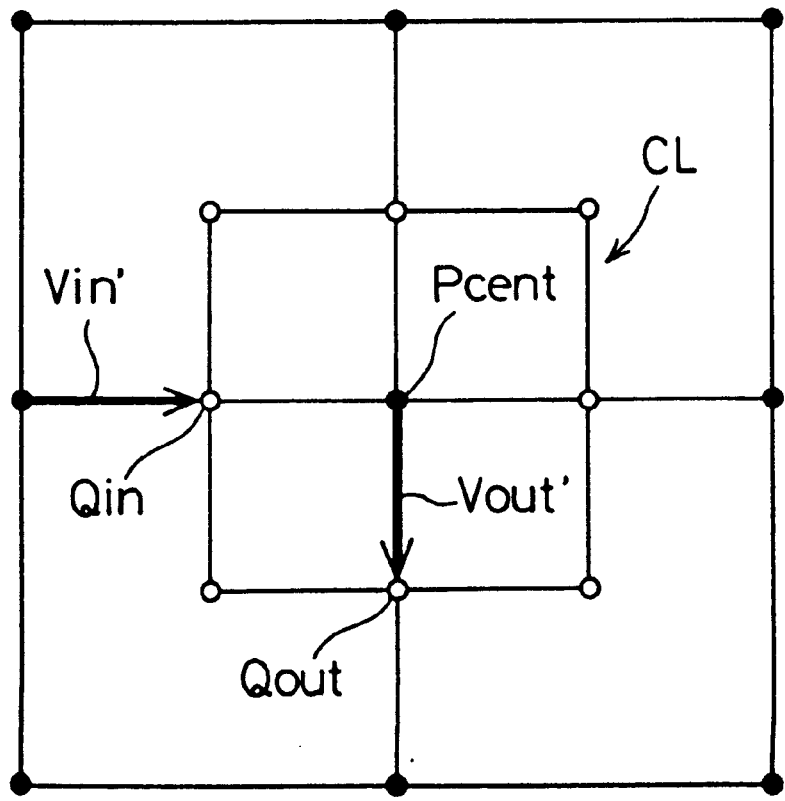

Fig. 21

| ORIGINAL CODE | BOUNDARY CONDITION | SUBSTITUTED CODE STRING | ILLUSTRATION | YES/NO |
|---|---|---|---|---|
| r | R | r l | | N |
| | S | s r | | Y |
| | | s l r r r l | | Y |
| | | s l r r s r | | N |
| | | s s r r | | N |
| | L | l r r s | | Y |
| | | l r r r l l | | N |
| | | l r s r r l | | Y |
| | | l r s r s r | | N |
| | | l r r l r r | | N |
| | | l r s r r s l l | | N |

Fig. 22
| ORIGINAL CODE | BOUNDARY CONDITION | SUBSTITUTED CODE STRING | ILLUSTRATION | YES OR NO |
|---|---|---|---|---|
| s | R | r l l r | 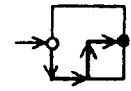 | Y |
| | | r l l s r r | 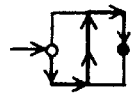 | N |
| | | r l l l r r s r | 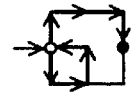 | N |
| | S | s r l l | 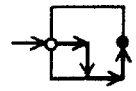 | N |
| | | s l r r | 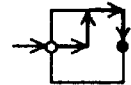 | N |
| | | s s | 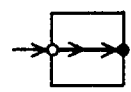 | Y |
| | L | l r r l | 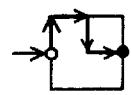 | Y |
| | | l r r s l l | 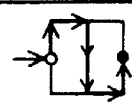 | N |
| | | l r r r l l s l |  | N |
| | | | 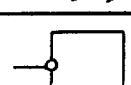 | |
| | | |  | |

Fig. 23
| ORIGINAL CODE | BOUNDARY CONDITION | SUBSTITUTED CODE STRING | ILLUSTRATION | YES OR NO |
|---|---|---|---|---|
| l | R | rlls |  | Y |
| | | rllrll | 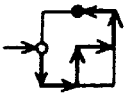 | N |
| | | rlllrr |  | N |
| | | rlsllr | 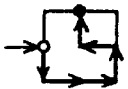 | Y |
| | | rlsllsrr | 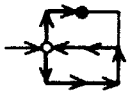 | N |
| | | rlslsl |  | N |
| | S | sl |  | Y |
| | | srllsl |  | N |
| | | srlllr | 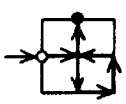 | Y |
| | | ssll | 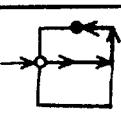 | N |
| | L | lr | 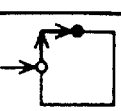 | N |

Fig. 24 (A)
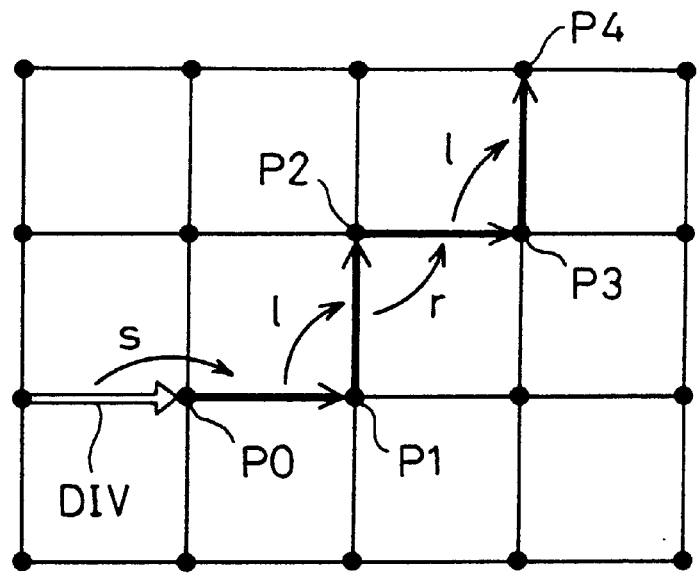
CODE STRING BEFORE TRANSFORM: s l r l
Fig. 24 (B)
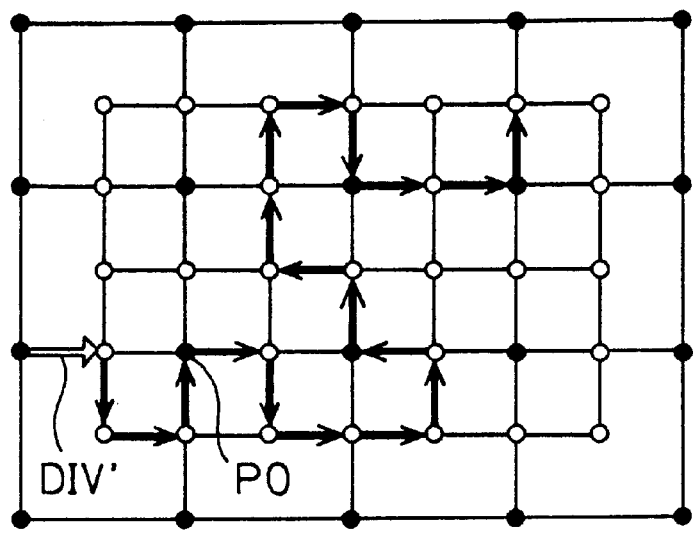
CODE STRING AFTER TRANSFORM: r l l r r l s l l r l r s r r l s l
CODES BEFORE TRANSFORM: s l r l

| POINT NUMBER | CODE | DIRECTIONAL VALUE OF INPUT VECTOR | DIRECTIONAL VALUE OF OUTPUT VECTOR | OUTPUT POINT |
|---|---|---|---|---|
| P0(1,5) | s | 0 | 0 | (2,5) |
| P1 | l | 0 | 3 | (2,4) |
| P2 | r | 3 | 0 | (3,4) |
| P3 | l | 0 | 3 | (3,3) |
| P4 | r | 3 | 0 | (4,3) |
| P5 | s | 0 | 0 | (5,3) |
| P6 | r | 0 | 1 | (5,4) |

|  | r | s | l |
|---|---|---|---|
| DIRECTIONAL VALUES | 0→1<br>1→2<br>2→3<br>3→0 | 0→0<br>1→1<br>2→2<br>3→3 | 0→3<br>1→0<br>2→1<br>3→2 |

⇔ r: CIRCULATION OF +1 (mod4)
s: IDENTITY PERMUTATION
l: CIRCULATION OF -1 (mod4)

(CODE IS ALLOCATED TO EACH UNIT LENGTH.)

DUMMY INITIAL VECTOR DIV'

Fig. 29(A)
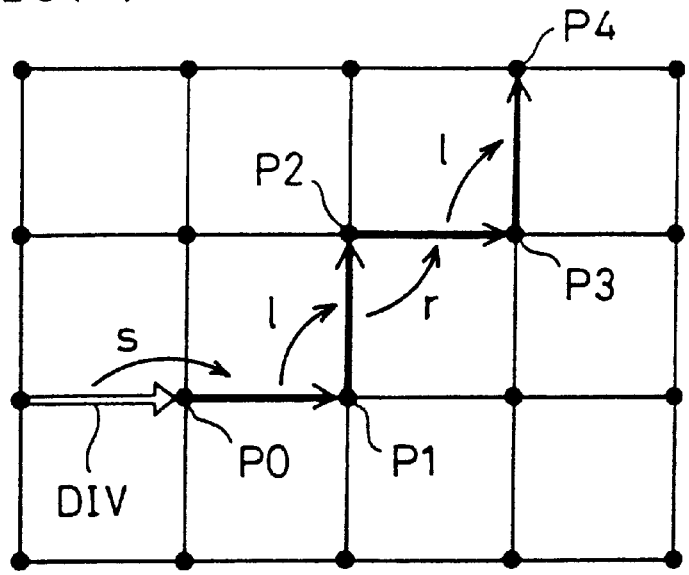
CODE STRING BEFORE TRANSFORM: slrl
Fig. 29(B)
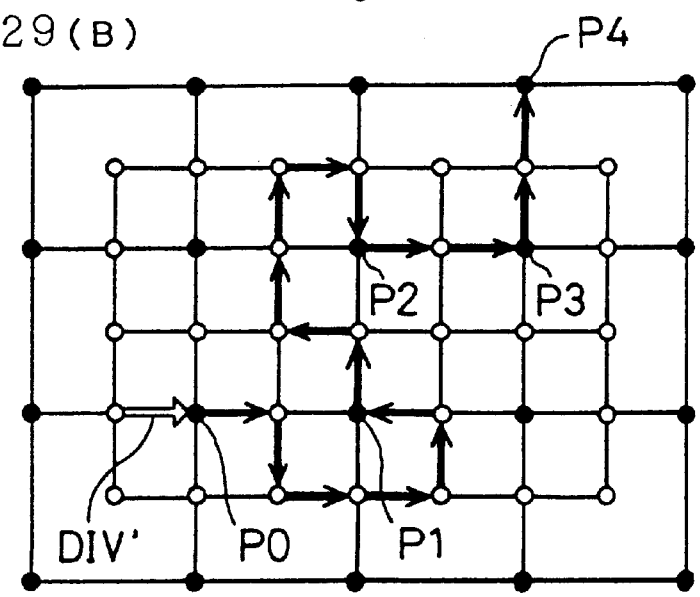
CODE STRINGS AFTER TRANSFORM: s rlsllrlrsrrlsl s
CODES BEFORE TRANSFORM: s l r l
(NON-TRANSFORMED)
ADDED srrr

| STRAIGHTNESS Ps | HORIZONTAL STRAIGHT LINE | SQUARE | 45°-INCLINED STRAIGHT LINE |
|---|---|---|---|
| 0.1 | 1.570189 | 1.581252 | 1.818589 |
| 0.2 | 1.533171 | 1.545158 | 1.731712 |
| 0.4 | 1.398508 | 1.420653 | 1.679071 |
| 0.6 | 1.22952 | 1.136533 | 1.509281 |
| 0.8 | 1.042904 | 1.029693 | 1.359074 |
| 0.9 | 1.030625 | 0.995577 | 1.267822 |
| 1.0 | 1.006799 | 0.981725 | 1.214685 |

Fig. 32(A)
Pf = 0.9, N = 3
| FIGURE | (B1) | (B2) | (B3) |
|---|---|---|---|
| STRAIGHTNESS Ps | 0.885 | 0.635 | 0.375 |
| ESTIMATED Fdim | 1.3 | 1.45 | 1.6 |
| MEASURED Fdim | 1.296558 | 1.464854 | 1.631906 |
Fig. 32(B1)  Fig. 32(B2)  Fig. 32(B3)
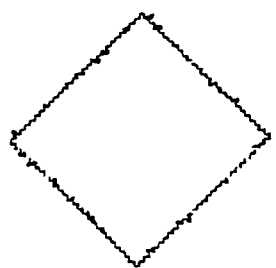
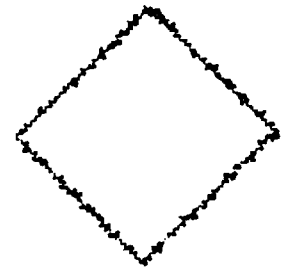
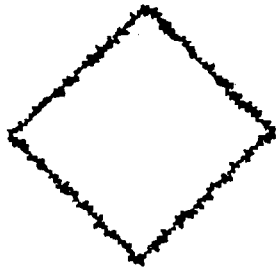

IMAGE BOUNDARY CORRECTION BY FRACTAL PROCESSING

BACKGROUND OF THE INVENTION

1. Field of the Invention

The present invention relates to a technique of correcting a boundary between images utilizing a computer system, and also to a fractal processing applicable to the boundary correction.

2. Description of the Related Art

A variety of methods have been proposed for correcting a boundary between images. For example, a method disclosed in U.S. Pat. No. 5,581,675 superimposes a noise upon image data in the vicinity of a boundary for the correction. Another method disclosed in JAPANESE PATENT PUBLICATION GAZETTE No. 7-113964 combines two image data with each other in the vicinity of their boundary while varying the composite ratio according to a distance from the boundary.

SUMMARY OF THE INVENTION

An object of the present invention is to correct an image boundary by a technique different from conventional techniques.

The present invention is directed to a method of correcting an image boundary. The method comprises the steps of: (a) specifying at least part of the image boundary as a target boundary portion to be processed; and (b) carrying out a fractal processing on the target boundary portion, thereby obtaining a corrected image boundary.

In a preferred embodiment, one cycle of the fractal processing magnifies the target boundary portion by a factor of M; and wherein the step (b) comprises the steps of: contracting the target boundary portion to $1/M^N$, where N is an integer of at least 1; and recursively executing the fractal processing by N times for the contracted target boundary portion.

According to the above procedure, the resulting boundary portion after the N cycles of the fractal processing will have the same size as the original target boundary portion before the fractal processing.

Preferably, the factor M is equal to 2.

In another preferred embodiment, the method further comprises the step of: connecting the corrected target boundary portion after the fractal processing with the original image boundary.

The method may further comprise the step of: carrying out a desired image processing on an image area including the corrected image boundary while utilizing the corrected image boundary. The desired image processing includes the step of: generating a gradation image having a plurality of uniform-density areas and a plurality of the corrected boundary portions between each pair of the uniform-density areas. Further, the desired image processing includes the step of: combining two image areas across the corrected boundary portion.

According to an as aspect of the present invention, the target boundary portion is a digital line consisting of a plurality of line segments each parallel to one of a plurality of coordinate axes; and wherein the fractal processing comprises the steps of: converting digital line data representing the digital line to chain code data including a plurality of code words each selected from three basic code words representing a right turn, a straight progress, and a left turn, respectively; transforming each code word included in the chain code data according to a predetermined transform rule into a code string including at least one code word, thereby generating transformed chain code data including a plurality of the code strings, wherein each code string after the transform is made so that a pre-selected one of a starting vector and a terminal vector in a series of vectors expressed by the code string after the transform at least partly overlaps a pre-selected one of a first-half vector and a second-half vector of a pair of vectors expressed by each code word before the transform; and decoding the transformed chain code data to generate transformed digital line data representing a transformed digital line having a higher fractal dimension than that of the digital line.

In the above procedure, a fractal dimension of a digital line is increased by the transformation of each code word into a code string. Since the chain code data is made of three basic code words of a right turn, a straight progress, and a left turn, the chain code data represent a digital line. A digital line having a higher fractal dimension can be obtained by decoding the transformed chain code data.

The transform rule includes a rule of substituting each of the three basic code words included in the chain code data with a code string according to three boundary conditions indicative of a right turn, a straight progress, and a left turn; and wherein the step of generating the transformed chain code data comprises the steps of: (1) selecting one of the three boundary conditions with respect to each code word to be transformed; and (2) transforming each code word to a code string according to the transform rule under the selected boundary condition.

In a preferred embodiment, the method further comprises the step of: specifying a first selection probability for selecting one of the three boundary conditions; and wherein the step (2) comprises the step of: (i) selecting one of the three boundary conditions according to the first selection probability. Since one of the three boundary conditions is randomly selected according to the first selection probability, the random complexity of the resulting digital line can be significantly increased.

The transform rule comprises a rule including a plurality of available code strings to be transformed from one code word under one boundary condition; and wherein the method further comprises the step of: when the plurality of available code strings are to be transformed from one code word according to the transform rule, specifying a second selection probability for selecting one of the plurality of available code strings; and wherein the step (i) comprises the step of: when the plurality of available code strings are to be transformed from one code word according to the transform rule, selecting one of the plurality of available code strings according to the second selection probability. The random complexity of the resulting digital line can be further increased accordingly.

In a preferred embodiment, the step of generating the transformed chain code data comprises the steps of: maintaining a front-end code in the chain code data unchanged; and adding a predetermined code word to an back-end of the transformed chain code data. This procedure will produce a transformed digital line which passes through all the original vertex points of the original digital line.

The method further comprises the step of: recursively executing the step of generating the transformed chain code data by a desired times. By recursively executing the transformation, the fractal dimension of the digital line can be increased up to a desired value.

The method may further comprise the steps of: measuring fractal dimensions of fundamental lines which are transformed according to the fractal processing with various combinations of the number of repetitions of the step of generating the transformed chain code data and the first and second selection probabilities; storing relationship between the measured fractal dimensions, the number of repetitions, and the first and second selection probabilities; specifying the number of repetitions and a desired fractal dimension prior to the step of generating the transformed chain code data; and setting the first and second selection probabilities prior to the step of generating the transformed chain code data so that the desired fractal dimension is be attained by the specified number of repetitions according to the relationship between the fractal dimension, the number of repetitions, and the first and second selection probabilities. This procedure will readily produce a digital line having a desired fractal dimension.

The present invention is also directed to an apparatus for correcting an image boundary. The apparatus comprising: extraction means for extracting at least part of the image boundary as a target boundary portion to be processed; and boundary correction means for carrying out a fractal processing on the target boundary portion, thereby obtaining a corrected image boundary.

The present invention is further directed to a method of processing a digital line consisting of a plurality of line segments each parallel to one of a plurality of coordinate axes. The method comprises: converting digital line data representing the digital line to chain code data including a plurality of code words each selected from three basic code words representing a right turn, a straight progress, and a left turn, respectively; transforming each code word included in the chain code data according to a predetermined transform rule into a code string including at least one code word, thereby generating transformed chain code data including a plurality of the code strings, wherein each code string after the transform is made so that a pre-selected one of a starting vector and a terminal vector in a series of vectors expressed by the code string after the transform at least partly overlaps a pre-selected one of a first-half vector and a second-half vector of a pair of vectors expressed by each code word before the transform; and decoding the transformed chain code data to generate transformed digital line data representing a transformed digital line having a higher fractal dimension than that of the digital line.

The present invention is also directed to an apparatus for processing a digital line consisting of a plurality of line segments each parallel to one of a plurality of coordinate axes. The apparatus comprises: coding means for converting digital line data representing the digital line to chain code data including a plurality of code words each selected from three basic code words representing a right turn, a straight progress, and a left turn, respectively; transforming means for transforming each code word included in the chain code data according to a predetermined transform rule into a code string including at least one code word, thereby generating transformed chain code data including a plurality of the code strings, wherein each code string after the transform is made so that a pre-selected one of a starting vector and a terminal vector in a series of vectors expressed by the code string after the transform at least partly overlaps a pre-selected one of a first-half vector and a second-half vector of a pair of vectors expressed by each code word before the transform; and decoding means for decoding the transformed chain code data to generate transformed digital line data representing a transformed digital line having a higher fractal dimension than that of the digital line.

These and other objects, features, aspects, and advantages of the present invention will become more apparent from the following detailed description of the preferred embodiments with the accompanying drawings.

BRIEF DESCRIPTION OF THE DRAWINGS

FIGS. 18(A1)–18(C2) show an increase of the coordinate lattice points with an increase in fractal dimension by the fractal dimension transform and changes of the input vector and output vector corresponding to the chain code data;

FIGS. 19(A1) and 19(A2) show coordinate lattice points when the line is magnified by the fractal dimension transform;

FIG. 21 shows the contents of a code book, in which the transform rules in the fractal dimension transform are written;

FIG. 22 shows the contents of a code book, in which the transform rules in the fractal dimension transform are written;

FIG. 23 shows the contents of a code book, in which the transform rules in the fractal dimension transform are written;

FIGS. 24(A) and 24(B) show an example of transforming the resolution of each code according to the code books;

FIGS. 29(A) and 29(B) illustrate another embodiment of transforming the resolution of each code;

FIGS. 32(A) and 32(B1)–32(B3) show the results of estimation of the fractal dimension;

DESCRIPTION OF THE PREFERRED EMBODIMENT

A. Structure of Apparatus

Figure 1:
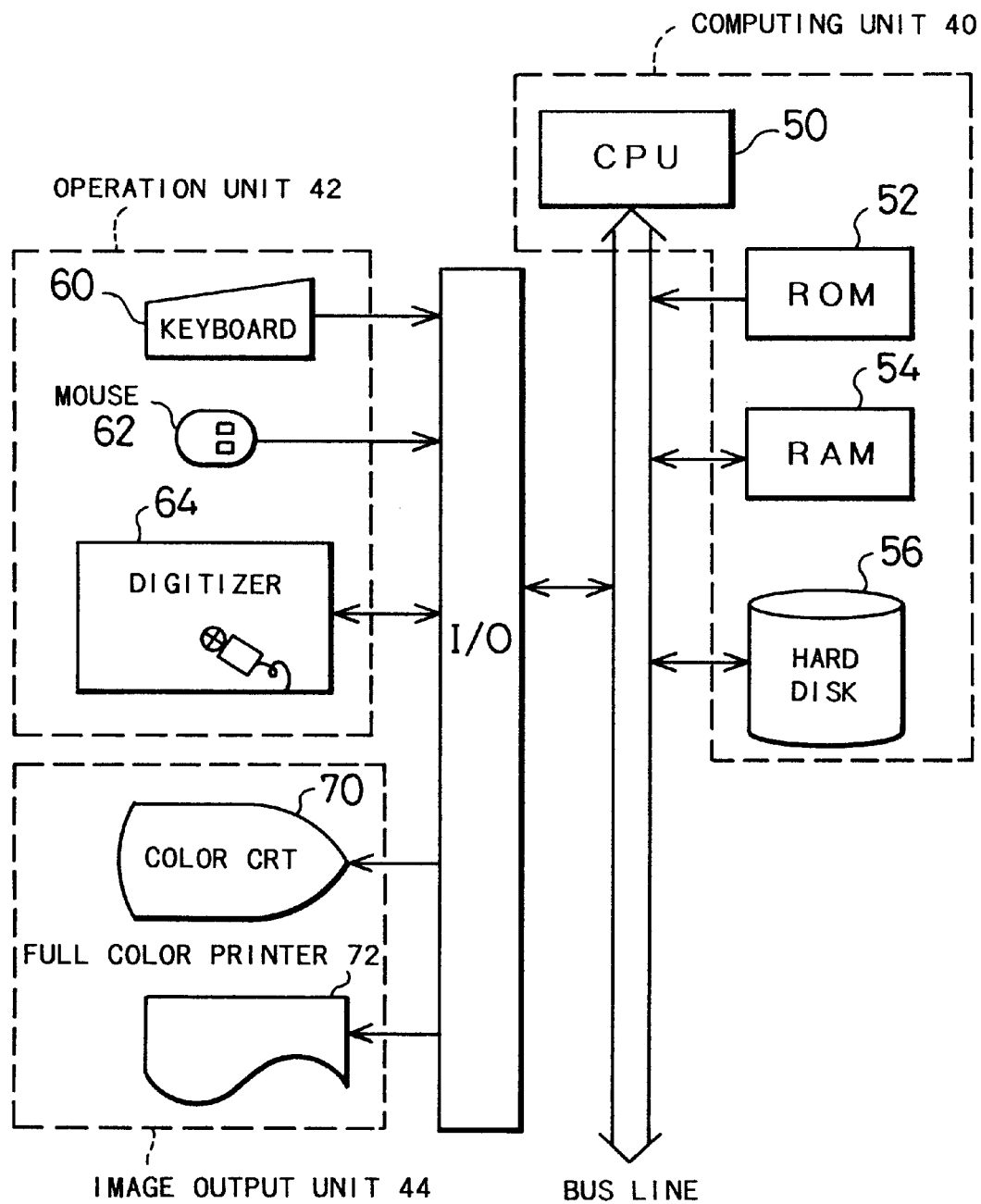
FIG. 1 is a block diagram illustrating the structure of an image processing apparatus embodying the present invention.

FIG. 1 is a block diagram illustrating the structure of an image processing apparatus embodying the present invention. This image processing apparatus is constructed as a general purpose computer system including a computing unit 40, an operation unit 42, and an image output unit 44.

The computing unit 40 includes a CPU 50, a ROM 52 and a RAM 54 working as main memories, and a hard disk unit 56 working as an external storage device. The operation unit 42 includes a keyboard 60, a mouse 62, and a digitizer 64. The image output unit 44 includes a color CRT 70 and a full color printer 72.

Figure 2:
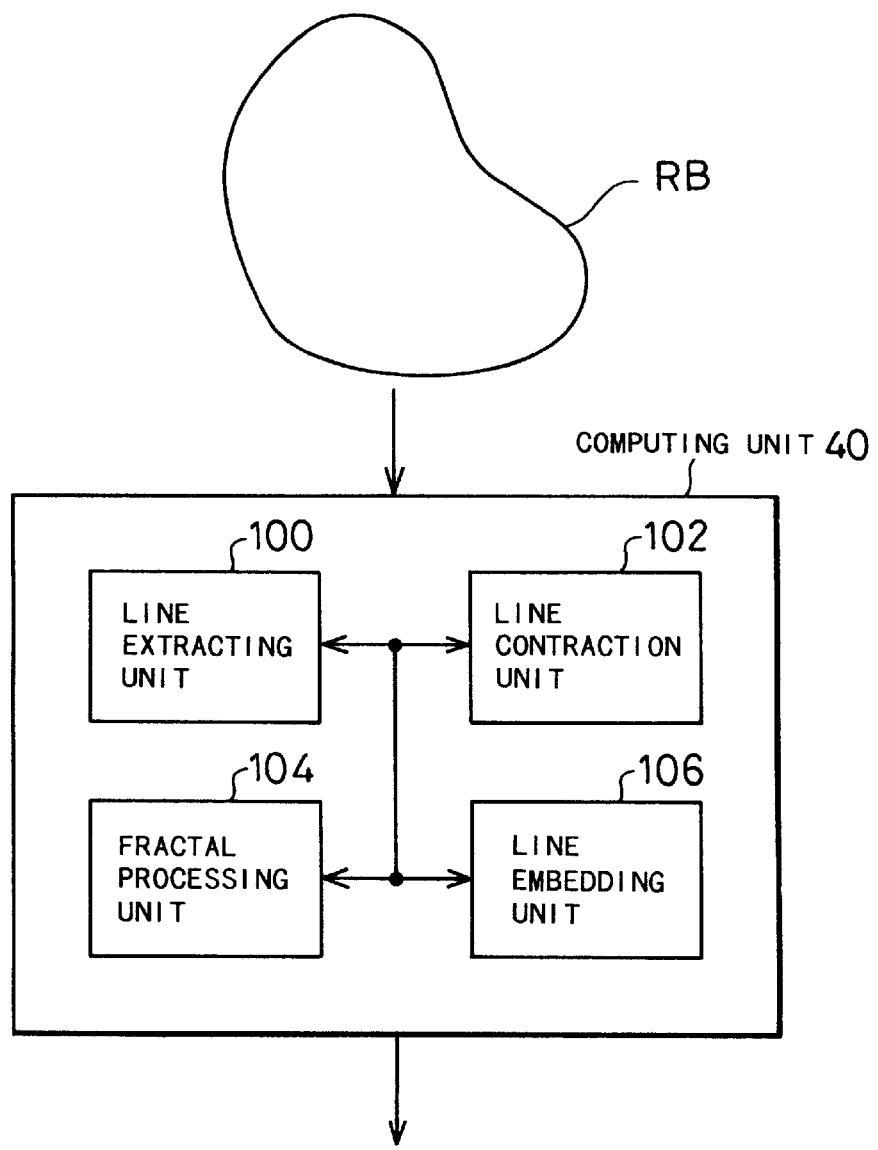
FIG. 2 is a functional block diagram illustrating various functions realized by a computing unit 40.

FIG. 2 is a functional block diagram illustrating functions of boundary correction realized by the computing unit 40. The computing unit 40 implements the functions of a line extracting unit 100, a line contraction unit 102, a fractal processing unit 104, and a line embedding unit 106. These units execute fractal processing on at least part of an original boundary RB to generate a corrected boundary RB'. The detailed functions of the respective units will be discussed later.

Application programs that realize the functions of the respective units shown in FIG. 2 is stored in a portable storage medium, such as floppy disks and CD-ROMs, and transferred from the storage medium to the main memory or the external storage device of the computer system. Alternatively, the software may be supplied from a program supply apparatus to the computer system via a communication line.

B. General Flow and Details of the Processing

Figure 3:
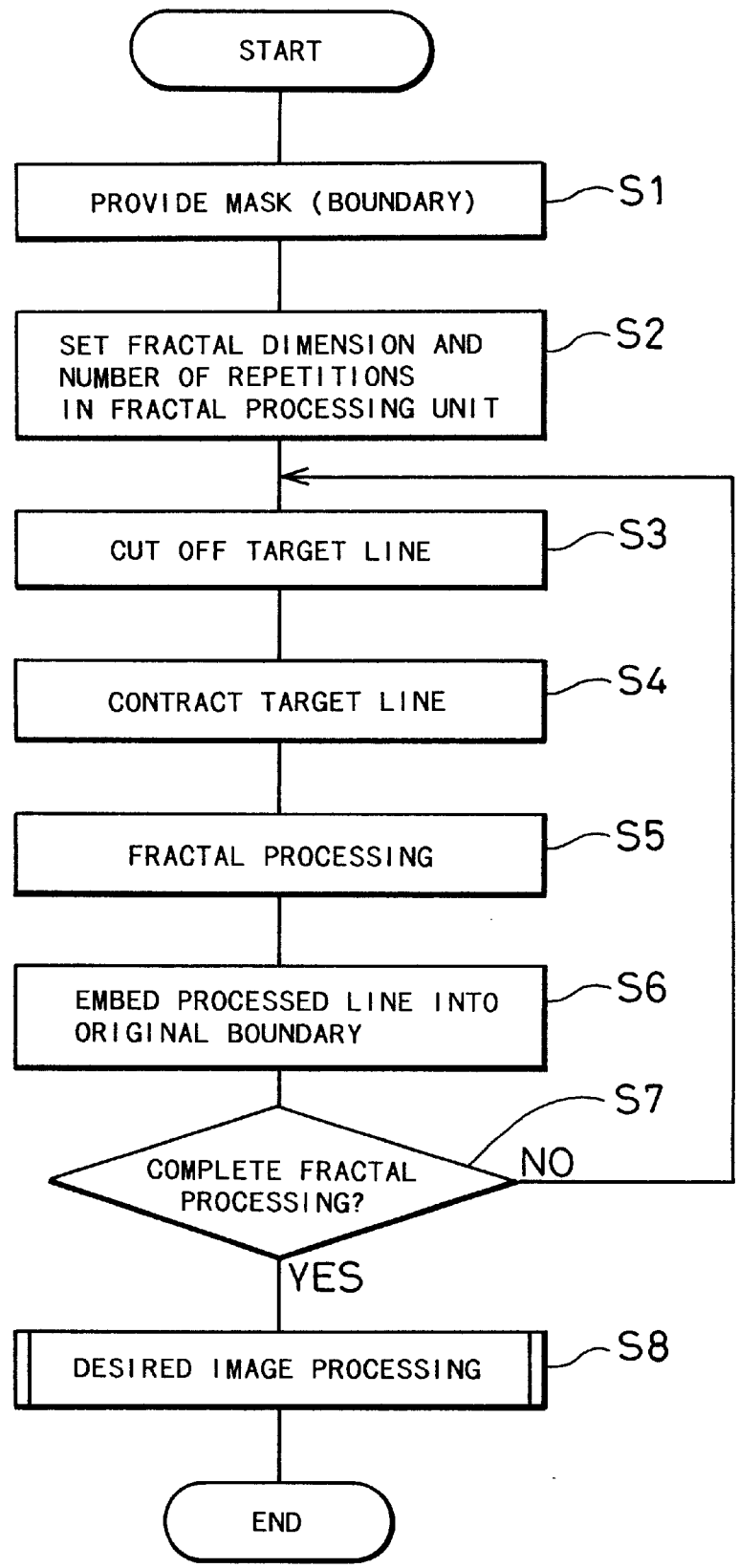
FIG. 3 is a flowchart showing a general processing routine executed in the embodiment.

FIG. 3 is a flowchart showing a general processing routine executed in the embodiment. When the program enters the processing routine, boundary data representing the original boundary RB shown in the upper portion of FIG. 2 are provided at step S1. The boundary data may have any data format as long as they represent a boundary between two image areas. By way of example, the boundary data may be bit map data representing pixel positions on the boundary or vector data representing an array of vectors that constitute the boundary.

There may be many purposes for the boundary correction: a first possible purpose is to make inconspicuous boundaries between adjacent uniform-density areas in a gradation image (or image having a gradually varying density at constant intervals); a second possible purpose is to make a boundary between two images inconspicuous when the two images are combined in the vicinity of the boundary. When a gradation image is a target of the processing, data representing the boundaries between adjacent uniform-density areas are often prepared in advance and included in the gradation image data. In this case, the uniform-density boundary data included in the gradation image data are used as the boundary data at step S1 in the flowchart of FIG. 3. When the image combining process is carried out on the boundary between two images, a mask is often used to represent a contour of one of the target images. In this case, mask data representing the mask are provided as the boundary data at step S1 in the flowchart of FIG. 3. In accordance with another embodiment, a user may specify a boundary of an image on the screen of the color CRT 70 to generate boundary data.

At step S2, the user specifies a fractal dimension D and a number of repetitions N of the processing as parameters of the fractal processing. It is preferable that the fractal dimension D is set in a range of 1.0 to 2.0. This is because the theoretical value of the fractal dimension in a two-dimensional line on a plane ranges from 1.0 to 2.0. The fractal dimension will be discussed later in detail. In accordance with a general procedure, the fractal processing is recursively executed N times. The greater number of the repetitions N of the fractal processing will make the resulting line to have a greater degree of complexity. It is generally preferable that the number of repetitions N is set equal to 2 or 3.

Figure 4:
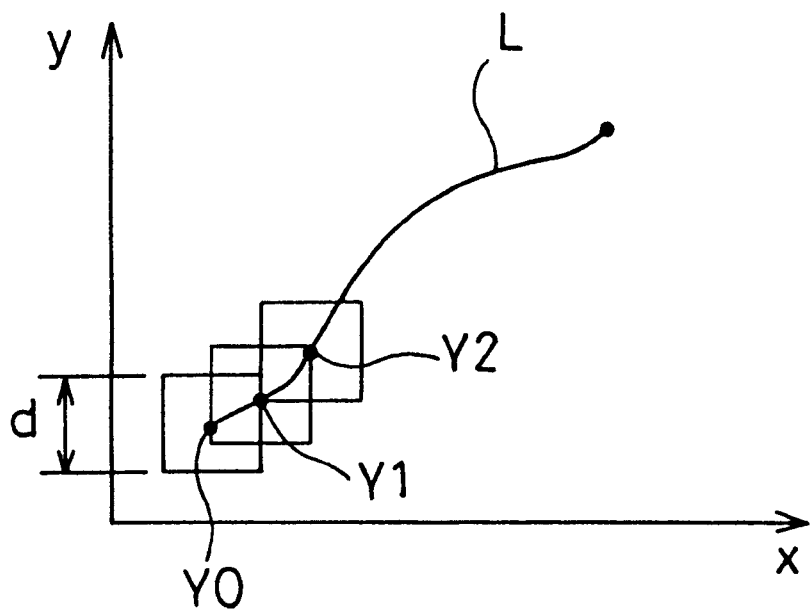
FIGS. 4(A) and 4(B) show a process of measuring the fractal dimension.
Figure 4:
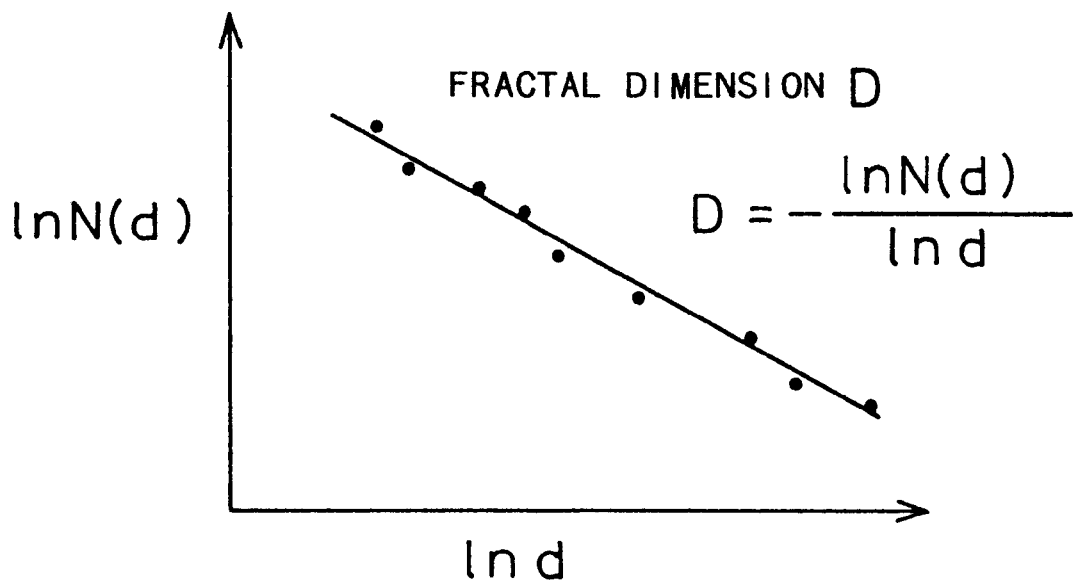

The fractal dimension D is an index quantitatively indicating a degree of complexity of an arbitrary line. The fractal dimension D is measured, for example, by Box Counting Method shown in FIGS. 4(A) and 4(B). The fractal dimension of an arbitrary line L shown in FIG. 4(A) is determined according to the following steps. A square of a width d is put on the line while its center is positioned at a starting point Y0. An intersection Y1 of the square and the line L is then detected. The square is shifted so that its center comes to the intersection Y1. Another intersection Y2 of the shifted square and the line L is determined subsequently. The line L is successively covered with the squares in this manner, and a number of squares, N(d), required to cover the whole line L is finally obtained. The number N(d) is a function of the width d of the square. The number of squares N(d) required for covering the whole line L is measured with respect to various values of the width d. FIG. 4(b) is a log-log graph showing the relationship between the number of squares N(d) and the width d As shown in FIG. 4(B), the fractal dimension D is defined as the slope of the plot.

The fractal dimension does not depend upon the size of the line L. For example, when the line L is simply magnified by a factor of M, the line of FIG. 4(B) is shifted upward by $\log_e M$. This means that the simple magnification or contraction does not change the fractal dimension. The fractal dimension is an index representing a degree of complexity of a line regardless of the size of the line.

The term 'fractal' implies the state wherein a part of a line (or figure) shows, when magnified, the same structure as the original line. The 'fractal dimension' is, however, not an index which can be defined for only such a fractal line, but it can be measured with respect to any line, as discussed above with the graphs of FIGS. 4(A) and 4(B).

An increase in fractal dimension of the line gives natural fluctuations to a magnified line or a line having an enhanced resolution. The higher fractal dimension will give a greater degree of complexity to a boundary of images, and thereby has a significant effect of making the boundary sufficiently inconspicuous.

Figure 5:
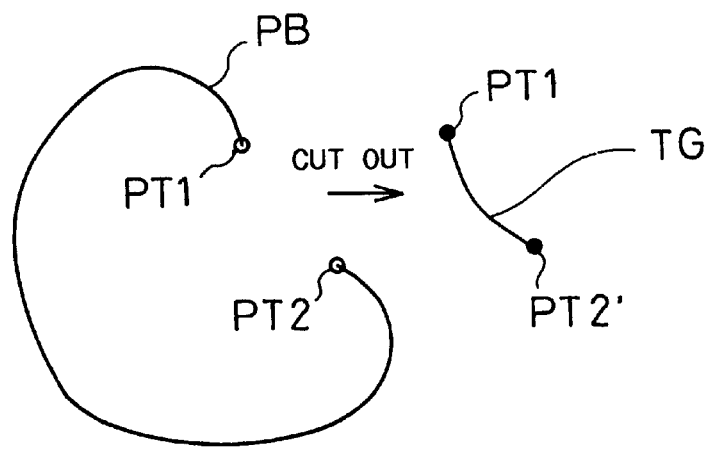
FIG. 5 shows the cut-off process executed at step S3.

Referring back to the flowchart of FIG. 3, at step S3, the user specifies a line portion as a target of the fractal processing, and the line extracting unit 100 then executes the process of cutting off (extracting) the specified line portion. FIG. 5 shows the cut-off process executed at step S3. In order to cut off part of the original boundary RB as a target line portion TG to be processed, for example, the user specifies the positions of two end points PT1 and PT2 on the original boundary RB with a pointing device, such as a mouse. The line extracting unit 100 (FIG. 2) extracts the line portion between the two points PT1 and PT2 as the target line portion TG. Open circles and closed circles in FIG. 5 are illustrated only as a matter of convenience, and are not shown on the real screen. Since the original boundary RB is represented by the boundary data, the actual cut-off process extracts the data part representing the target line portion TG specified by the user on the screen from the overall boundary data.

Figure 6:
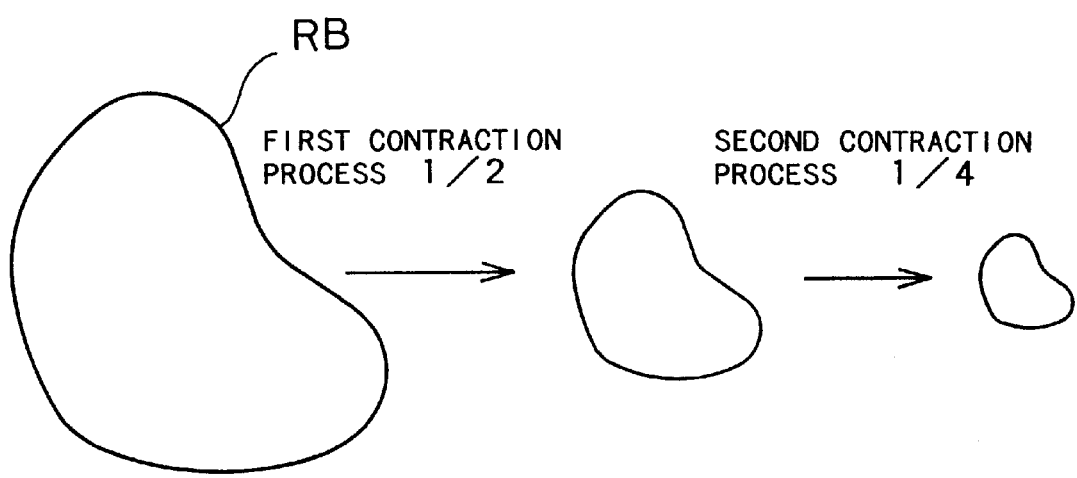
FIG. 6 shows the contraction process executed at step S4.

Referring back again to the flowchart of FIG. 3, at step S4, the target line portion TG is contracted or reduced in size. The contraction process is carried out so that the target line portion that is recursively subjected to the fractal processing at subsequent step S5 will be well joined with the original boundary RB. As described blow, one cycle of the fractal processing doubles the resolution. If the size of each pixel in the original boundary RB is fixed constant, the two-fold increase in resolution means the two-fold magnification of the line. When the fractal processing is repeated by N times, the target line portion TG is magnified by a factor of $2^N$. At step S4, the target line portion TG is accordingly reduced in size in advance by the number of repetitions N set at step S2. In accordance with a concrete procedure, the target line portion TG is reduced in size by a factor of $½^N$. FIG. 6 shows the contraction process executed at step S4. Although the whole original boundary RB is reduced in the example of FIG. 6 as a matter of convenience, the actual process may reduce only the target line portion TG. When the number of repetitions N of the fractal processing is set equal to 2, the contraction process for contracting the figure to a half size is carried out twice as shown in FIG. 6, or otherwise the contraction process of contracting the figure to a quarter size is carried out once.

If one cycle of the fractal processing magnifies the line by a factor of M (wherein M denotes a positive number and usually an integer), the target line portion TG is reduced in size by a factor of $1/M^N$ at step S4. When the non-recursive fractal processing (for example, the processing according to the Fourier filtering method) is carried out, the contraction process of step S4 is not required.

Figure 7A:
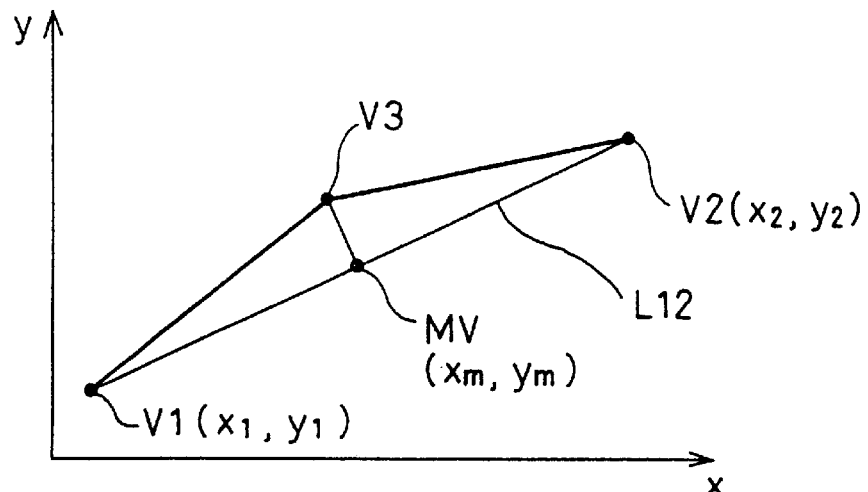
FIGS. 7(A)–7(C) show the fractal processing according to a midpoint displacement method.
Figure 7B:
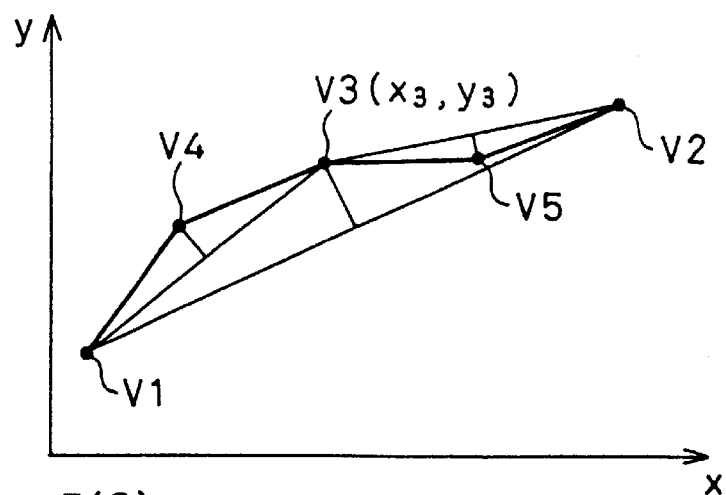
Figure 7C:
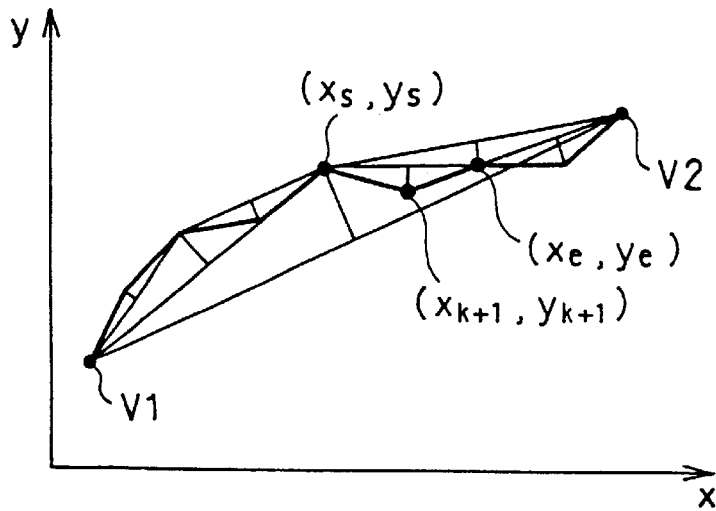

Referring back to the flowchart of FIG. 3, at step S5, the fractal processing is executed on the target line portion TG. FIGS. 7(A)–7(C) briefly show the fractal processing according to a midpoint displacement method. In the example of FIGS. 7(A)–7(C), the fractal processing is carried out on a line portion L12 between two points V1 and V2. A first transform shown in FIG. 7(A) determines coordinates ($x_m$, $y_m$) of a midpoint MV of the line portion L12 according to Equations 1 given below:

$$x_m = \frac{x_1 + x_2}{2} \quad (1)$$

$$y_m = \frac{y_1 + y_2}{2}$$

A point V3 is set on the line that starts from the midpoint MV and is perpendicular to the line portion L12. A unit vector in the direction perpendicular to the line portion L12 (that is, the direction going from the midpoint MV to the point V3) is given by Equation 2 below:

$$(a, b) = \left( \frac{-(y_2 - y_1)}{\sqrt{(x_2 - x_1)^2 + (y_2 - y_1)^2}}, \frac{(x_2 - x_1)}{\sqrt{(x_2 - x_1)^2 + (y_2 - y_1)^2}} \right) \quad (2)$$

In the midpoint displacement method, coordinates ($x_3,y_3$) of the point V3 are defined by Equations 3 given below:

$$x_3 = x_m + a \times R_g \times 2^{-D} \quad y_3 = y_m + b \times R_g \times 2^{-D} \quad (3)$$

wherein Rg denotes Gaussian random numbers having a mean value equal to 0 and a standard deviation equal to 1 (that is, random numbers having a frequency distribution of values following the Gaussian distribution), and D denotes a fractal dimension. As clearly understood from the format of Equations 3, the second term of the right-hand side of each line of Equation 3 corresponds to a difference between the coordinates of the midpoint Mv and those of the point V3. This difference is hereinafter referred to as the 'displacement of the midpoint'. Equations 3 clearly show that the displacement of the midpoint depends upon the fractal dimension D.

A second transform shown in FIG. 7(B) implements the fractal processing for a line portion between the points V1 and V3 and another line portion between the points V3 and V2. In accordance with a concrete procedure, another point V4 is set between the points V1 and V3, whereas still another point V5 is set between the points V3 and V2. Here the points V4 and V5 are set to be located on the opposite sides along the progressing direction of the series of the line portions passing through the three points V1, V3, and V2 (for example, the direction going from the point V1 to the point V2). FIG. 7(C) shows a third transform.

In general, coordinates ($x_{k+1}$, $y_{k+1}$) of a point set by a k-th division are given by Equation 4 below:

$$x_{k+1} = \frac{x_s + x_e}{2} + \frac{-(y_e - y_s)R_g}{\sqrt{(x_e - x_s)^2 + (y_e - y_s)^2}} \times 2^{-kD} \quad (4)$$

$$y_{k+1} = \frac{y_s + y_e}{2} + \frac{(x_e - x_s)R_g}{\sqrt{(x_e - x_s)^2 + (y_e - y_s)^2}} \times 2^{-kD}$$

wherein ($x_s,y_s$) and ($x_e,y_e$) denote coordinates of both end points of a line portion prior to the k-th division (see the example of FIG. 7(C)). Since the second term of the right-hand side of each line of Equation 4 (that is, the term representing the displacement of the midpoint) includes $2^{-kD}$, the displacement of the midpoint decreases with an increase in number k of division, and the line becomes finer accordingly. The division is repeated by a predetermined number of times or until each division becomes smaller than a predetermined critical value ε (ε>0).

The recursive fractal processing according to the midpoint displacement method increases the fractal dimension. Namely a relatively simple line can be transformed to a line having a greater degree of complexity. As used herein, the term 'line' has a broader meanings including straight lines and curves.

It may be considered that the increase in degree of complexity of the line by the fractal processing results in enhancing the resolution of the line. For example, it may be thought that the line defined by the three points V1, V3, and V2 in the drawing of FIG. 7(A) has a resolution which is twice as high as that of the original line portion L12. The process of increasing the fractal dimension of the line while keeping the overall size of the line unchanged corresponds to an increase in resolution of the line. In this case, since the overall size of the line is not changed by the fractal processing, the contraction process executed at step S4 in the flowchart of FIG. 3 is not required.

If the fractal processing of the line is carried out while a distance between adjoining lattice points (or pixels) is kept unchanged, on the other hand, the line would be magnified by the fractal processing. Since the fractal processing increases the number of pixel points constituting the line, the procedure of keeping the distance between adjoining pixel points unchanged, which means to keep the size of each pixel, results in expanding the line as a whole. One cycle of the fractal processing according to the midpoint displacement method under such conditions magnifies the line twice. The recursive execution of the fractal processing by N times thus magnifies the line by a factor of $2^N$. By way of example, the line of FIG. 7(C) obtained after three cycles of the fractal processing is magnified eight times as large as the original line portion shown in FIG. 7(A). As discussed previously, the target line portion TG is contracted in advance by a factor of $\frac{1}{2}^N$ at step S4 in the flowchart of FIG. 3. The processed line obtained after N cycles of the fractal processing accordingly has the same size as that of the target line portion TG (FIG. 5) cut off from the original boundary RB.

Figure 8:
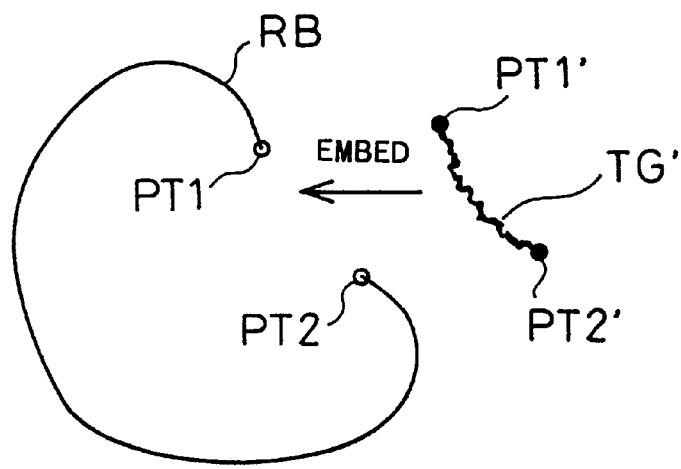
FIG. 8 shows the embedding process executed at step S6.

Referring back again to the flowchart of FIG. 3, at step S6, the line embedding unit 106 embeds the target line portion after the fractal processing (that is, the processed line) into the original boundary RB. FIG. 8 shows the embedding process executed at step S6. In the example of FIG. 8, a processed line TG' is embedded in the original position of the boundary RB between the points PT1 and PT2. In accordance with an actual procedure, data representing the processed line TG' are inserted into the space between the points PT1 and PT2 of the boundary data representing the original boundary RB. This procedure gives a corrected boundary, in which only the portion of the processed line TG' has been subjected to the fractal processing.

At step S7 in the flowchart of FIG. 3, it is determined whether or not all the fractal processing has been completed for the boundary RB. If it has not been completed, the program returns to step S3. The fractal processing may be carried out for a plurality of line portions included in the boundary RB. The fractal dimension D and the number of repetitions N of the fractal processing may be changed for each target line portion. In this case, the program returns from step S7 to step S2.

Figure 9:
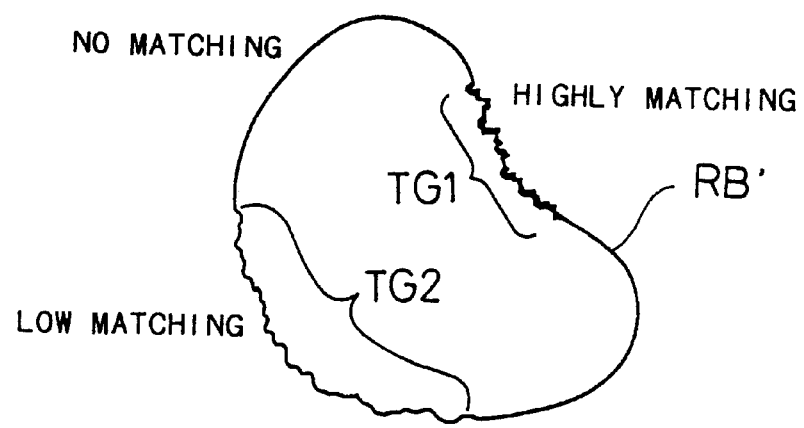
FIG. 9 shows a boundary RB' obtained after the fractal processing, in which different fractal dimensions are set on two boundary portions TG1 and TG2.

FIG. 9 shows a boundary RB' obtained after the fractal processing, in which different fractal dimensions are set on two boundary portions TG1 and TG2. A relatively high fractal dimension is given the first line portion TG1 while a relatively low fractal dimension is given to the second line portion TG2. This enables the first line portion TG1 to have the greater degree of complexity. When two images are combined across the corrected boundary RB', the first line portion TG1 having the greater degree of complexity will show the greater matching between the two images because the boundary portion TG1 is relatively inconspicuous. On the other hand, the second line portion TG2 having the smaller degree of complexity will show the smaller matching between the two images.

Referring back again to the flowchart of FIG. 3, a desired image processing is carried out at step S8 using the processed boundary as a mask. Examples of the image processing executed at step S8 include creation of a gradation image and composition of two adjoining images.

Figure 10:
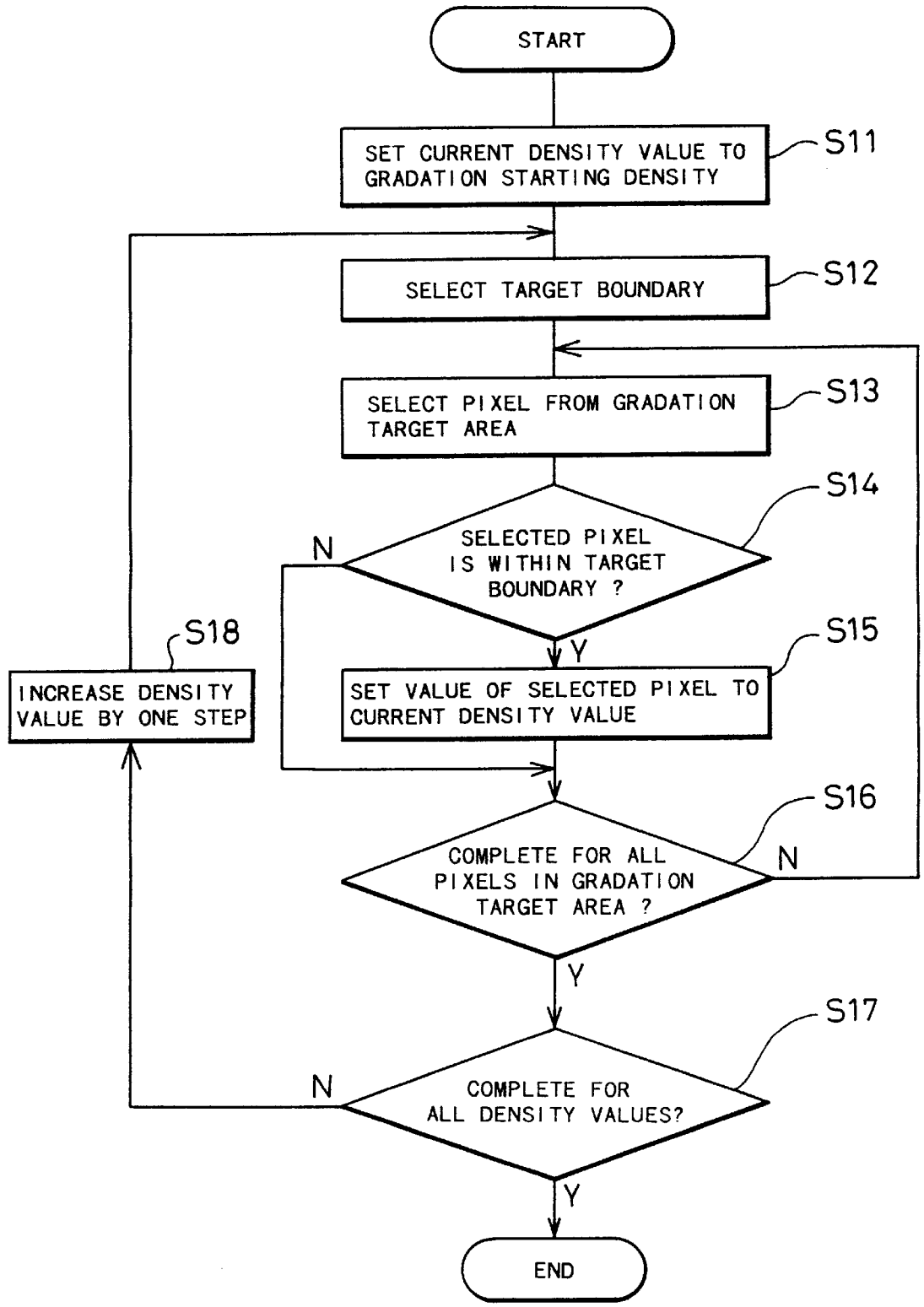
FIG. 10 is a flowchart showing a routine of creating a gradation image.

FIG. 10 is a flowchart showing a routine of creating a gradation image, and FIGS. 11(A) and 11(B) show an exemplified process of creating a gradation image. In this example, a gradation image including three uniform-density boundaries TG10 through TG12 is created in a picture frame FR shown in FIG. 11(A). These three uniform-density boundaries TG10 through TG12 have previously been subjected to the fractal processing according to the routine shown in the flowchart of FIG. 3.

When the program enters the routine of FIG. 10, a density value Dn used in the subsequent processing steps is set equal to a gradation starting density at step S11. The gradation starting density here represents the density in a starting area of a gradation image. For example, when the density value Dn of the gradation image ranges from 10% to 40% as shown in FIG. 11(A), the gradation starting density is equal to 10% (or 40%).

A boundary corresponding to the current density value Dn (hereinafter referred to as the 'boundary of interest') is then automatically selected at step S12. In the example of FIG. 11(A), the boundary corresponding to the density value Dn=10 includes part of the picture frame FR and the first uniform-density boundary TG10. The boundary corresponding to the density value Dn=20 includes part of the picture frame FR and the two uniform-density boundaries TG10 and TG11.

The program subsequently goes to step S13 to select one pixel out of a gradation target area (the area surrounded by the picture frame FR), and to step S14 to determine whether or not the selected pixel is within the boundary of interest. When the selected pixel is within the boundary of interest, the program proceeds to step S15, at which the value of the selected pixel is set equal to the current density value Dn. When the selected pixel is not within the boundary of interest, on the contrary, the program skips step S15 and goes to step S16.

At step S16, it is determined whether or not the processing of steps S13 through S15 has been completed for all the pixels included in the gradation target area. When not concluded, the program returns to step S13 to select a next pixel. Repetition of steps S13 through S16 enables one uniform-density area to be filled with the current density value Dn of 10%.

At step S17, it is determined whether or not the filling process of steps S12 through S16 has been completed for all the density values. When not completed, the program goes to step S18 to increase the density value Dn by one step. Namely the current density value Dn is changed to the density value of the next area (Dn=20% in the example of FIG. 11(A)).

Figure 11:
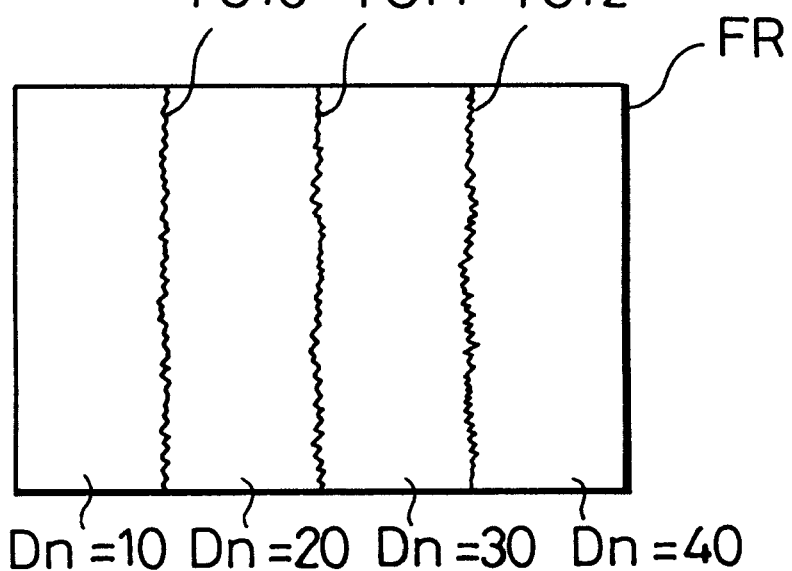
FIGS. 11(A) and 11(B) show the process of creating a gradation image.
Figure 11:
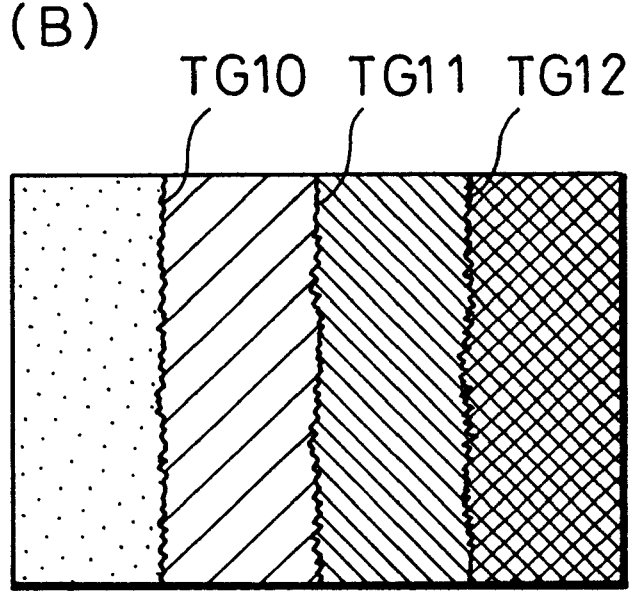

Repetition of steps S12 through S18 fill the respective uniform-density areas included in the gradation target area surrounded by the picture frame FR with respective density values Dn. FIG. 11(B) shows a resulting gradation image thus obtained. The three uniform-density boundaries TG10 through TG12 that have been subjected to the fractal processing in advance are not conspicuous to the naked eye. In case that the density value Dn is set to different values from those in the example of FIG. 11, the procedure of FIG. 10 using the same picture frame and uniform-density boundaries gives another gradation image having a different density gradation. Unlike the conventional method of correcting the boundary by superposition of a noise, this embodiment corrects the shape of the boundary by the fractal processing and thus enables a variety of image processing operations to be carried out with the same corrected boundary by any desired times.

Figure 12:
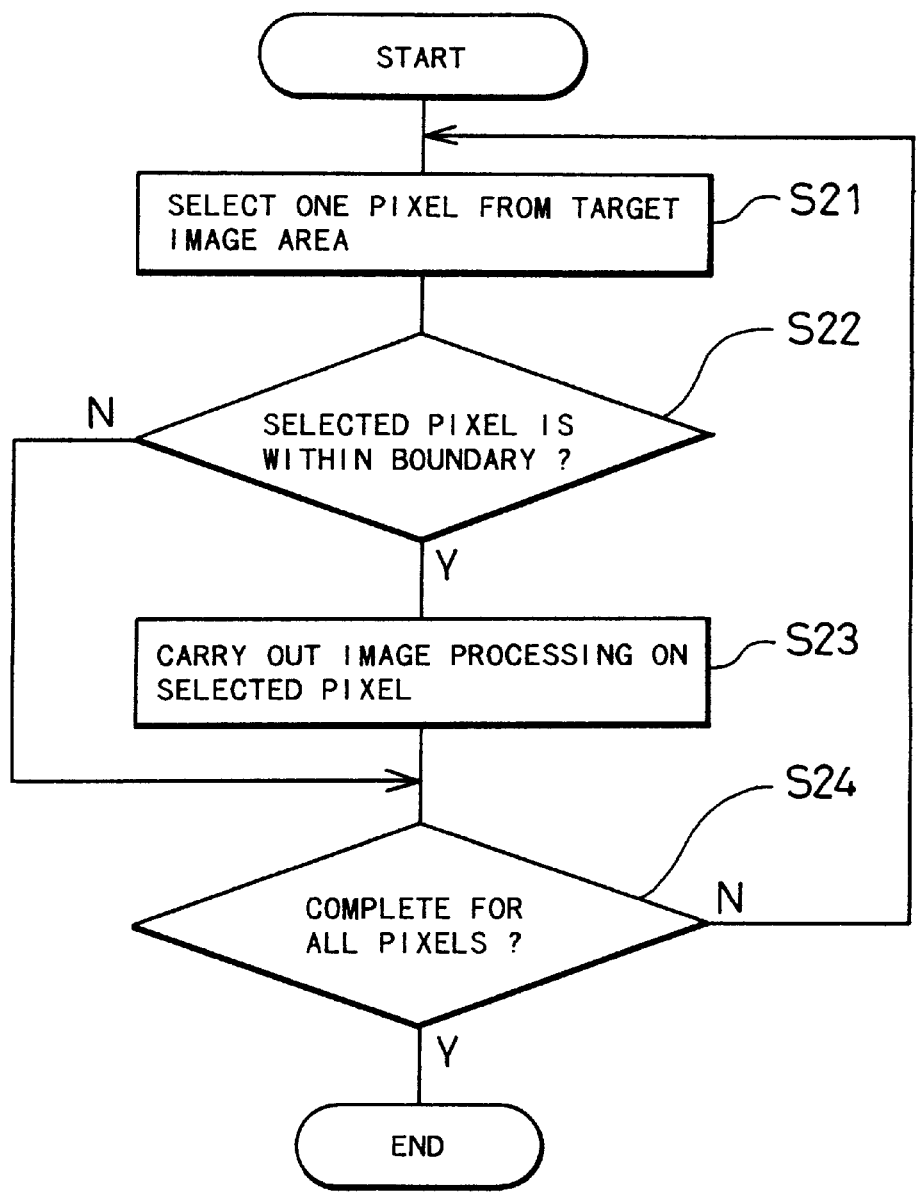
FIG. 12 is a flowchart showing a routine of combining image areas with each other.

FIG. 12 is a flowchart showing a routine of combining image areas with each other. As an example, the corrected boundary RB' shown in FIG. 9 is positioned in a background image, and another image (hereinafter referred to as the 'embedded image') is embedded within the corrected boundary RB'. When the program enters the routine of FIG. 12, one pixel is selected out of an image area of interest at step S21. The image area of interest here denotes a relatively wider area including the corrected boundary RB' of FIG. 9. At subsequent step S22, it is determined whether or not the selected pixel is within the corrected boundary RB'. When the selected pixel is within the corrected boundary RB', the program proceeds to step S23, at which the selected pixel is subjected to a predetermined image processing operation (in this embodiment, the process of allocating the pixel value of the embedded image to the selected pixel). When the selected pixel is out of the corrected boundary RB', on the other hand, the program skips step S23 and goes to step S24. It is then determined at step S24 whether or not the processing of steps S21 through S23 has been completed for all the pixels. When not completed, the program returns to step S21 and repeats the processing of steps S21 through S23.

Since the portions TG1 and TG2 of the boundary RB' shown in FIG. 9 have been subjected to the fractal processing in advance, the boundary between two image areas is inconspicuous especially on these portions in the resulting composite image. A desired image processing operation (for example, color change) other than the image composition may be carried out at step S23 in the flowchart of FIG. 12. A variety of different images can readily be created from the same boundary RB' by varying the parameters or the contents of the image processing operation executed at step S23 in the flowchart of FIG. 12.

As described above, the embodiment carries out the fractal processing on a boundary between images prior to a variety of image processing operations, whereby various image processing operation can be performed repeatedly using the same corrected boundary while, for example, varying parameters for the processing. In a conventional boundary correction method that superposes a noise upon the image data in the vicinity of the boundary, the noise-superposing process must be repeated every time when the image processing operation is carried out. The boundary correction method of this embodiment, on the other hand, does not require the repeated correction of the boundary. In another conventional boundary correction method that combines two images with each other with a composite ratio which varies with a distance from the boundary, re-calculation of the composite ratio is required for every image-combining process and thereby consumes a relatively long processing time. The boundary correction method of this embodiment, on the other hand, can omit the calculation of the composite ratio depending on the distance, thereby effectively shortening the processing time required for the image-combining process.

C. Another Embodiment of Fractal Processing
C-1. Structure of Fractal Processing Unit 104

The fractal processing may be implemented by other operations other than the midpoint displacement method described above with the drawing of FIG. 7. In another embodiment below, the fractal processing is also referred to as the 'fractal dimension transform'.

Figure 13:
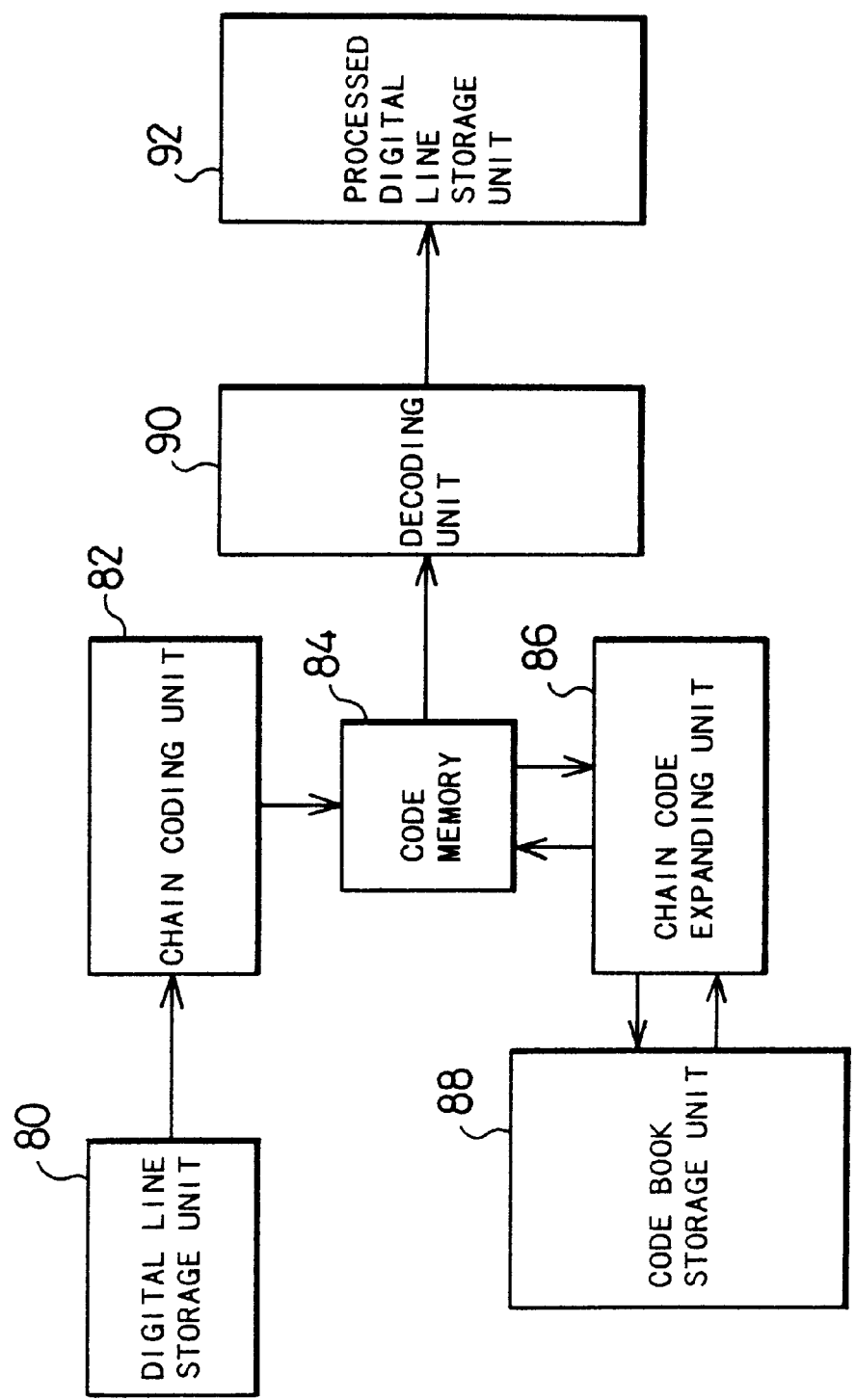
FIG. 13 is a functional diagram illustrating various functions realized by a fractal processing unit 104.

FIG. 13 is a functional block diagram illustrating functions of another fractal processing operation realized by the fractal processing unit 104. The fractal processing unit 104 realizes the functions of a digital line storage unit 80, a chain coding unit 82, a code memory 84, a chain code expanding unit 86, a code book storage unit 88, a decoding unit 90, and a processed digital line storage unit 92.

The digital line storage unit 80 stores digital line data representing a digital line prior to the processing. The chain coding unit 82 converts the 10 digital line data to chain code data, which includes three code words 'r', 's', and 'l'. The first code word 'r' means a right turn, the second code word 's' means a straight progress, and the third code word 'l' means a left turn.

The details of the chain code data and the coding process will be discussed later. The code memory 84 stores the chain code data.

The chain code expanding unit 86 transforms each code word included in the chain code data to a code string, which consists of a plurality of code words, thereby increasing the fractal dimension of the digital line. The details of the function of the chain code expanding unit 86 will be discussed later. The code book storage unit 88 stores a code book (described later) used by the chain code expanding unit 86.

The decoding unit 90 decodes the transformed chain code data and thereby generates digital line data of a higher fractal dimension (or transformed digital line data). The processed digital line storage unit 92 stores the transformed digital line data.

The chain coding unit 82 corresponds to the coding means of the claimed invention. The chain code expanding unit 86 and the decoding unit 90 respectively correspond to the transform means and the decoding means of the claimed invention. The code book stored in the code book storage unit 88 corresponds to the transform rule of the claimed invention.

The application programs that realize the functions of the respective units shown in FIG. 13 are stored in a portable storage medium such as floppy disks and CD-ROMs, and transferred to the main memory (that is, the RAM 54) or the external storage device (that is, the hard disk unit 56) of the computer system. Alternatively, the programs may be supplied from a program supply apparatus to the computer system via a communication line.

C-2. Flow and Details of the Fractal Processing

Figure 14:
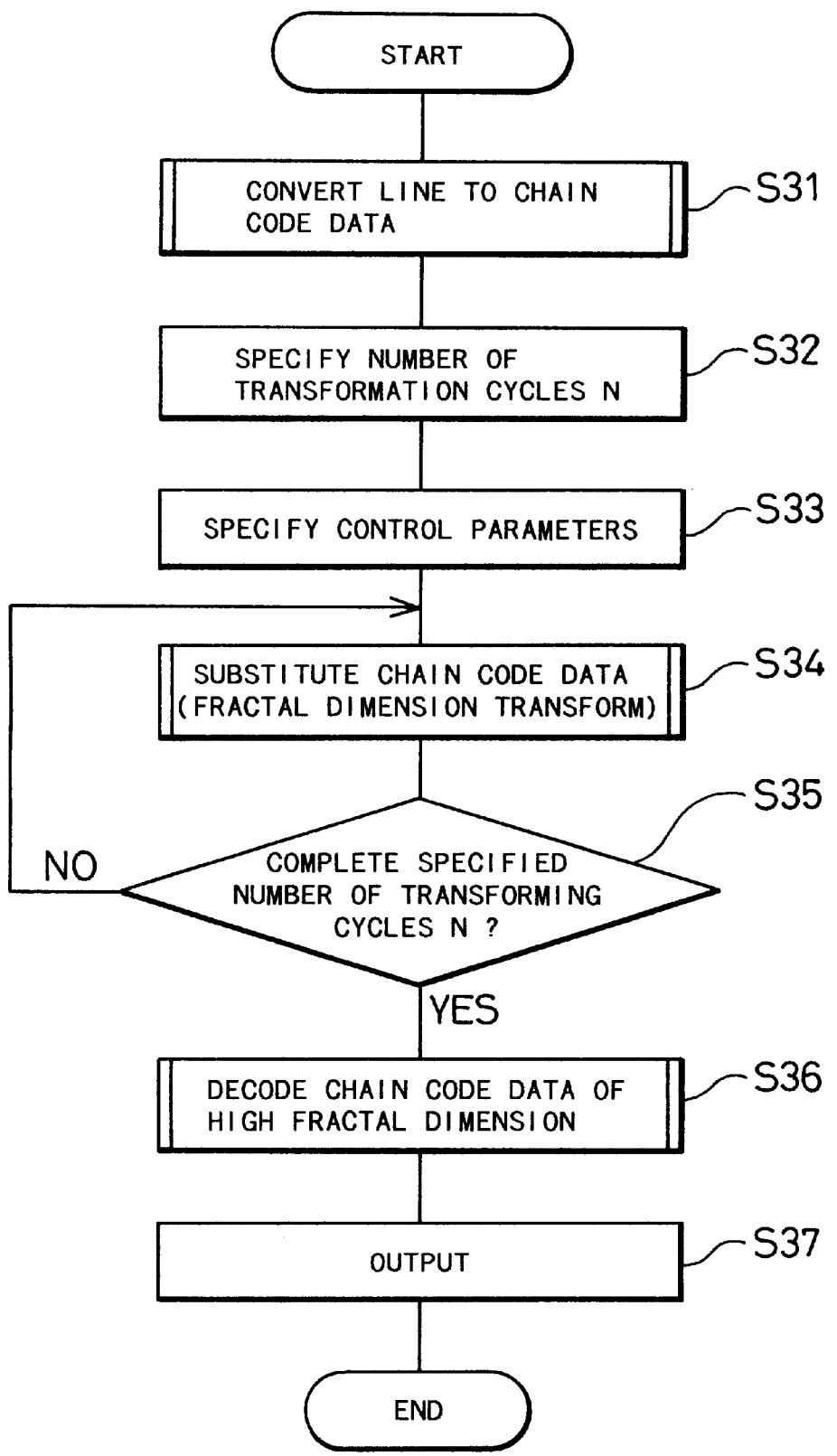
FIG. 14 is a flowchart showing a general routine of the fractal processing with chain code data.

In this embodiment, it is assumed that a boundary after the contraction process described above has already been converted to a digital line. The digital line consists of a plurality of line segments each parallel to one of two coordinate axes. FIG. 14 is a flowchart showing a general routine of the fractal processing using the chain code data. When the program enters the routine of FIG. 14, the chain coding unit 82 first converts the digital line to chain code data at step S31.

Figure 15A:
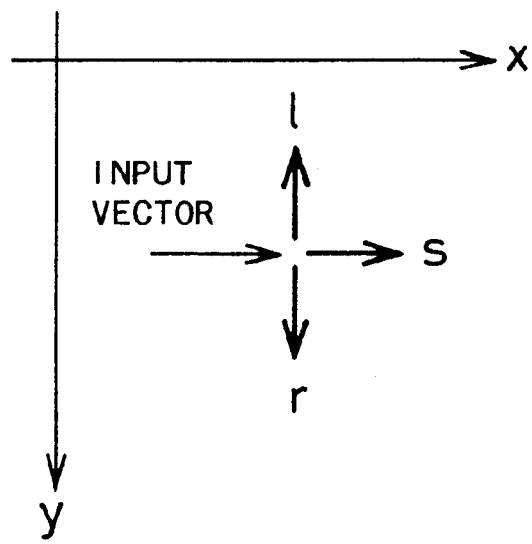
FIGS. 15(A) and 15(B) show the meanings of the respective codes 'r', 's', and 'l' of the chain code data.
Figure 15B:
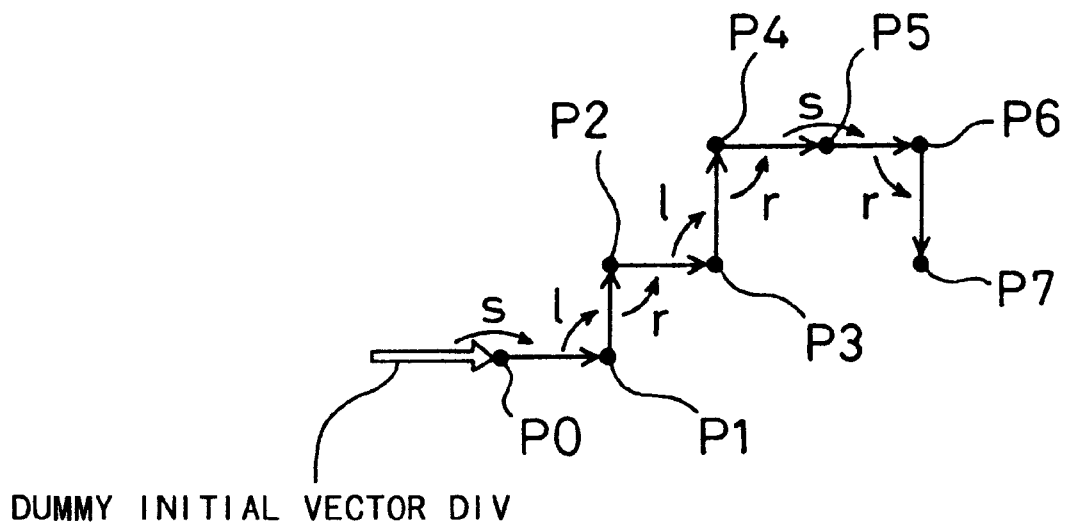

FIGS. 15(A) and 15(B) show the meanings of the respective codes 'r', 's', and 'l' of the chain code data. It can be thought that the digital line (hereinafter may be referred to as the 'line figure') is a series of vectors of a unit length that are successively connected with one another. As shown in FIG. 15(A), a unit vector next to a certain input vector has a direction of a right turn, a straight progress, or a left turn from the input vector. The chain coding uses the three codes, that is, the right turn 'r', the straight progress 's', and the left turn 'l', to represent the relationship between the two adjoining unit vectors. The chain code data is also referred to as rls code data. In coding of a digital line, coordinates of a starting point P0 and a dummy initial vector DIV directing to the starting point P0 are set as shown in FIG. 15(B). The chain code data representing the digital line will consist of code words representing a series of unit vectors following the dummy initial vector DIV.

Figures 16A, 16B:
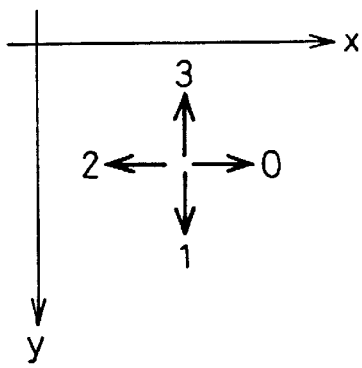
FIGS. 16(A) and 16(B) show the relationship between the directions of unit vectors constituting a digital line and the codes included in chain code data.

FIGS. 16(A) and 16(B) show directional values allocated to the respective directions of unit vectors constituting the digital line as well as the relationship between changes of directional values and the code words of the chain code data. The 'directional values' are used to represent a direction of the digital line. In this embodiment, as shown in FIG. 16(A), the directional values of '0', '1', '2', and '3' are allocated respectively to x direction, y direction, –x direction, and –y direction in a left-hand x-y coordinate system. As shown in FIG. 16(B), the right turn 'r' corresponds to an arithmetic operation of adding '1' to the directional values (a carry of the addition should be neglected). The straight progress 'S' corresponds to an arithmetic operation of maintaining the directional values, whereas the left turn 'l' corresponds to an arithmetic operation of subtracting '1' from the directional values (a borrow of the subtraction should be neglected). The operator 'mod 4' shown in the right-hand side of FIG. 16(B) denotes the process of adopting only the remainders of '0' through '3' obtained by dividing the respective integers by 4, that is, the process of neglecting a carry or a borrow in the 2-bit arithmetic operation.

Figures 17A, 17B:
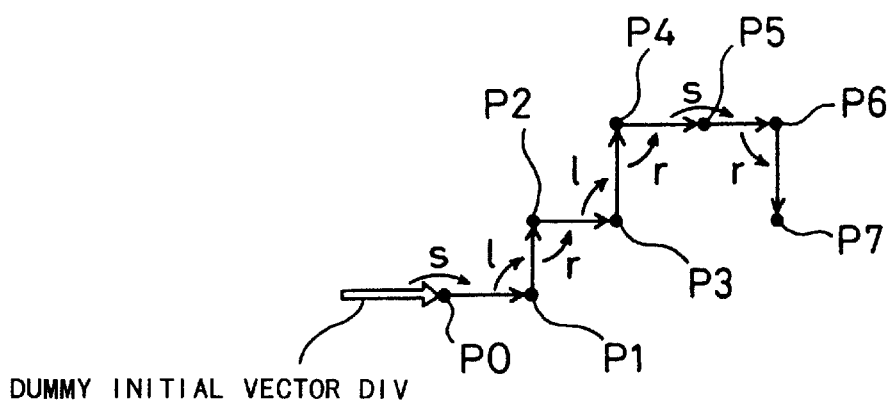
FIGS. 17(A) and 17(B) show an example of the chain coding process.

FIGS. 17(A) and 17(B) show an example of the chain coding process. The starting point P0 represents a vertex point existing on one end of a digital line. In case that the digital line is a closed line, any vertex point can be specified as the starting point P0. The dummy initial vector DIV has a predetermined direction. Although the dummy initial vector DIV may have any desired direction, it is preferable, as shown in FIG. 17(A), that the dummy initial vector DIV has the same direction as that of a start unit vector next to the dummy initial vector DIV. Directions of an input vector and an output vector at respective points P0 through P7 are expressed by the directional values in the two central columns of FIG. 17(B). A change in the directional value between the input vector and the output vector at each point is converted to a code word of the chain code data according to the rules shown in FIG. 16(B). The chain code data thus obtained are stored in the code memory 84. The details of the chain coding process will be discussed later.

Referring back to the flowchart of FIG. 14, after the digital line is converted to the chain code data at step S31, the user specifies a number of repetitions N of the fractal dimension transform (may also be referred to as the 'number of transforming cycles') at step S32. The user then specifies two control parameters Ps and Pf used for the fractal dimension transform at step S33. The meanings of these parameters Ps and Pf will be described later.

At subsequent step S34, the chain code expanding unit 86 carries out one cycle of fractal dimension transform. The fractal dimension transform substitutes each code word of the chain code data with a substantially equivalent code string, thereby increasing the fractal dimension of the digital line.

FIGS. 18(A1)–18(A2), 18(B1)–18(B2), and 18(C1)–18 (C2) respectively show an increase of coordinate lattice points and changes of the input vector and output vector corresponding to the chain code data when a fractal dimension is increased. In the example of FIGS. 18(A1)–18(C2), a distance between adjoining coordinate lattice points is reduced to ½ with an increase in fractal dimension. In this case, the increase in fractal dimension means an increase in resolution.

Nine closed circles in FIG. 18(A1) represent the original lattice points while eight open circles in FIG. 18(A2) represent new lattice points arranged in the vicinity of a center lattice point Pcent of FIG. 18(A1) in the course of enhancing the resolution. A rectangle defined by these eight new lattice points and the original lattice point Pcent is hereinafter referred to as a cell CL.

The process of increasing the fractal dimension shown in FIGS. 18(A1)–18(C2) adds the new lattice points between the original lattice points, thus doubling the resolution. The process of doubling the resolution is equivalent to the process of transforming one lattice point Pcent to one cell CL including plural points.

The input vector and the output vector expressed by each code word are also transformed with an increase in resolution. As shown in FIG. 18(A1), the code word 'r' showing a right turn passing through the original lattice point Pcent represents a change of the direction between an input vector Vin going to the lattice point Pcent and an output vector Vout going from the lattice point Pcent. A code string obtained by enhancing the resolution of the code word 'r' represents a series of vectors including a new input vector Vin' going to the cell CL and a new output vector Vout' going from the center lattice point Pcent of the cell CL to another lattice point on one end of the cell CL. Vectors connecting the new input vector Vin' to the new output vector Vout' can be set arbitrarily and are thereby omitted from the illustration of FIGS. 18(A1)–(C2). In this embodiment, the positions of a starting point Qin, from which the array of vectors enters the cell CL, and a terminal point Qout, from which the array of vectors leaves the cell CL, are restricted to the centers of the sides of the cell CL.

The input vector Vin' going to the cell CL is identical with an output vector of a previous cell and is thereby defined by a code string regarding the previous cell. The series of vectors expressed by the transformed code string are connected in sequence from the input vector Vin' to the output vector Vout'. The vectors in the cell may be arbitrarily selected among the alternatives included in the code book discussed below.

It should be noted that, in FIGS. 18(A1)–18(C1), the transformed output vector Vout' is set to pass through the center lattice point Pcent of the cell CL and have the same direction as that of the non-transformed, original output vector Vout. In other words, the transformed output vector Vout' is set to partially (strictly speaking, by ½) overlap the non-transformed, original output vector Vout. This enables the series of vectors after the transform of the resolution to be substantially equivalent to the series of vectors prior to the transform of the resolution, irrespective of the connection of the vectors in the cell CL. Namely the resolution can be improved without significantly changing the shape of the line.

FIGS. 19(A1) and 19(A2) show the coordinate lattice points when the line is magnified with an increase in fractal dimension. FIGS. 19(A1) and 19(A2) respectively correspond to FIGS. 18(A1) and 18(A2). Comparison between FIGS. 18(A1) and 18(A2) and FIGS. 19(A1) and 19(A2) clearly shows the following facts. Increase in resolution from FIGS. 18(A1) to FIG. 18(A2) keeps the pitch of the original lattice points shown by the closed circles unchanged and adds the new lattice points shown by the open circles in the middle of the original lattice points, thereby reducing the final pitch of the lattice points to ½ and increasing the number of lattice points. Magnification of the line from FIGS. 19(A1) to FIG. 19(A2), on the other hand, doubles the pitch of the original lattice points shown by the closed circles and adds the new lattice points shown by the open circles in the middle of the original lattice points, thereby keeping the final pitch of the lattice points unchanged and doubling the size of the line. Increase of the resolution and the magnification of the line are substantially equivalent processes to increase the fractal dimension, with a difference that the final pitch of the lattice points (that is, the pitch of the pixels) is reduced to ½ or kept unchanged.

It should be noted that, in the magnification process of the line shown in FIGS. 19(A1) and 19(A2), the transformed output vector Vout' is set to pass through the center lattice point Pcent of the cell CL and have the same direction as that of the non-transformed, original output vector Vout. In other words, the transformed output vector Vout' is set to completely overlap (or conform to) the non-transformed, original output vector Vout.

Figure 20A:
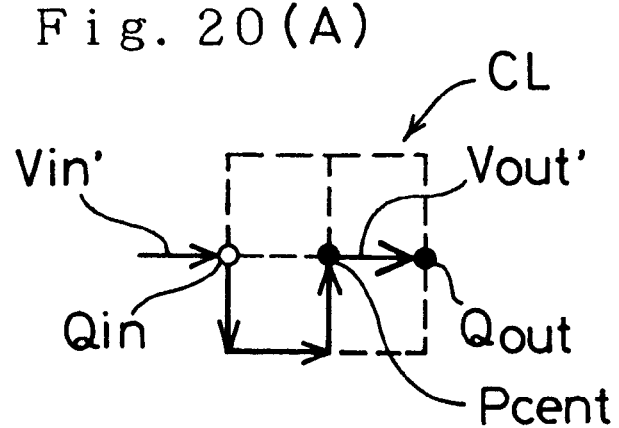
FIGS. 20(A)–20(C) illustrate some examples of connection of the array of vectors in a cell CL.
Figure 20B:
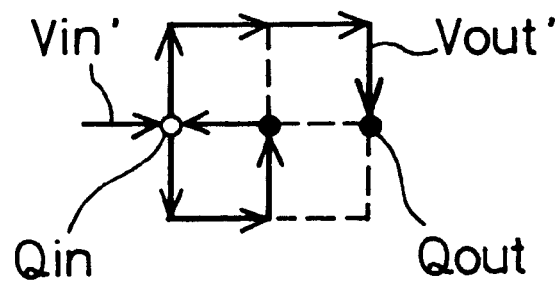
Figure 20C:
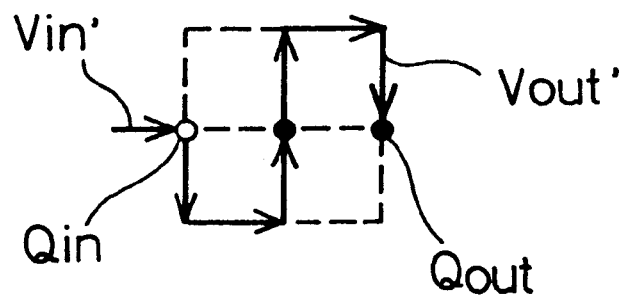

FIGS. 20(A)–20(C) illustrate some examples of connection of the series of vectors in the cell CL. FIGS. 20(A)–20(C) show the case of the code word 's' representing a straight progress. There are many arrangements other than those shown in FIGS. 20(A) through 20(C), which are applicable to the series of vectors successively connecting with one another from the starting point Qin to the terminal point Qout of the cell CL. In this embodiment, the following restrictions are set regarding the connection of the series of vectors in the cell CL, so as to allow only some types of the series of vectors.

[Restriction 1] The transformed output vector Vout' reaching the terminal point Qout of the cell is required to pass through the lattice point Pcent on the center of the cell and have the same direction as that of the non-transformed, original output vector Vout.

[Restriction 2] The series of vectors in the cell is not allowed to have any self-crossing at the starting point Qin of the cell.

The restriction 1 has already been described with the drawings of FIGS. 18(A1)–18(C2). The series of vectors shown in FIGS. 20(B) and 20(C) are not allowed because of the restriction 1. The restriction 1 implies that the transformed output vector Vout' should at least partly overlap the non-transformed, original output vector Vout.

The 'self-crossing' of the restriction 2 implies that the series of vectors form a loop as shown in the lower left corner of FIG. 20(B). The restriction 2 prohibits any self-crossing at the starting point Qin of the cell, but allows a self-crossing that does not cross at the starting point Qin of the cell. The series of vectors shown in FIG. 20(B) includes a 'self-crossing at the starting point Qin of the cell' and is accordingly rejected by either of the restrictions 1 and 2.

The self-crossing is prohibited because the transform of the line to have a self-crossing may cause various troubles, such as mistakably changing a filing area which was defined by the original series of vectors.

From this viewpoint, it is preferable in some cases that the restriction 2 is replaced by a stricter restriction that the series of vectors in the cell is not allowed to have any self-crossing In case that the self-crossing does not cause any troubles, the restriction regarding the self-crossing may be omitted.

The restriction 1 may be replaced by another restriction regarding the vector at the starting point of the cell. The alternative restriction may be that the transformed input vector Vin' starts from the starting point Qin and pass through the lattice point Pcent at the center of the cell and have the same direction as that of the non-transformed, original input vector Vin. Another alternative may be that the transformed input vector Vin' overlaps at least partly the non-transformed, original input vector Vin.

In this embodiment, the series of vectors in the cell allowed by the above restrictions 1 and 2 are specified in advance as code books and registered into the code book storage unit 88 (FIG. 13). FIGS. 21 through 23 show the contents of the code books, in which the transform rules in the fractal dimension transform are written. For example, the leftmost column in FIG. 21 shows the code prior to the transform (the code 'r' representing a right turn), the second column shows boundary conditions, the third column shows code strings after the transform (may also be referred to as 'substitute code string'), the fourth column shows series of vectors expressed by the substitute code strings, and the fifth column shows whether or not each substitute code string is used. FIGS. 22 and 23 have the same constructions.

The boundary conditions show which one of a right turn, a straight progress, and a left turn is selected as the first code word included in the substitute code string. There are three boundary conditions, that is, a right turn 'R', a straight progress 'S', and a left turn 'L'. The capital letters R, S, and L are used to be distinguished from the codes. The substitute code string having the symbol 'Y' in the column of YES OR NO are registered in the code book (that is, allowed), whereas those having the symbol 'N' are not registered in the code book (that is, not allowed).

As discussed later, the control parameter Ps indicates a probability in selecting one of the three boundary conditions R, S, and L. In some cases, one original code word may be transformed into plural code strings under an identical boundary condition (for example, the case of the boundary condition 'S' in FIG. 21) In such cases, the control parameter Pf indicating a probability of selecting one of the plural alternatives is used for the selection. The procedure of the selection will also be described later.

FIGS. 24(A) and 24(B) show an example of transforming code words to code strings according to the code books shown in FIGS. 21 through 23. As shown in FIG. 24(A), an original code string prior to the transform is 'slrl'. FIG. 24(B) shows assignment of code strings after the transform, which is given as an example, to the respective code words prior to the transform. The transform of code words shown in the lower portion of FIG. 24(B) is allowed in the code books shown in FIGS. 21 through 23.

Figure 25:
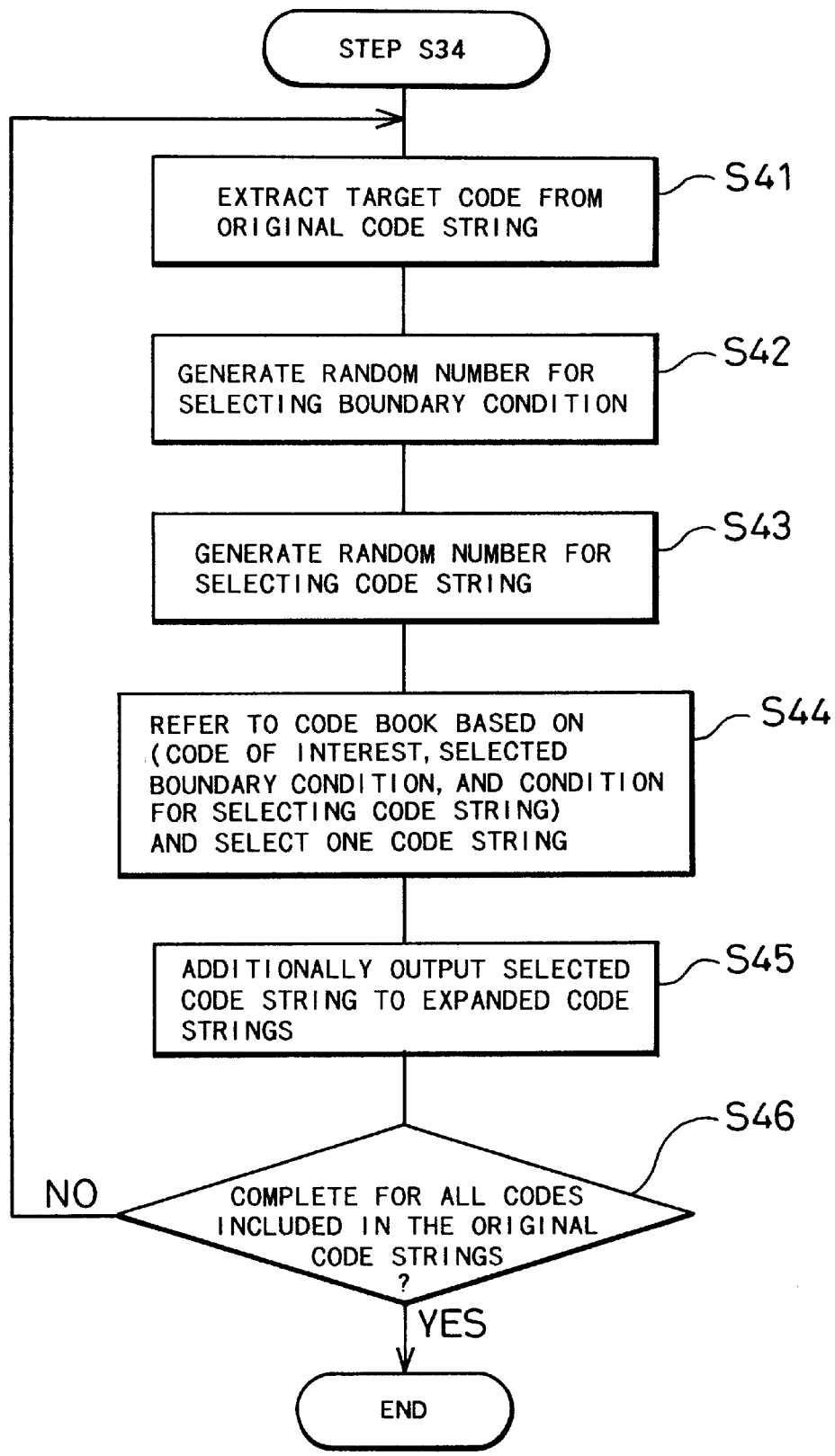
FIG. 25 is a flowchart showing details of the fractal dimension transform of the chain code data executed at step S34 in the flowchart of FIG. 14.
Figure 26A:
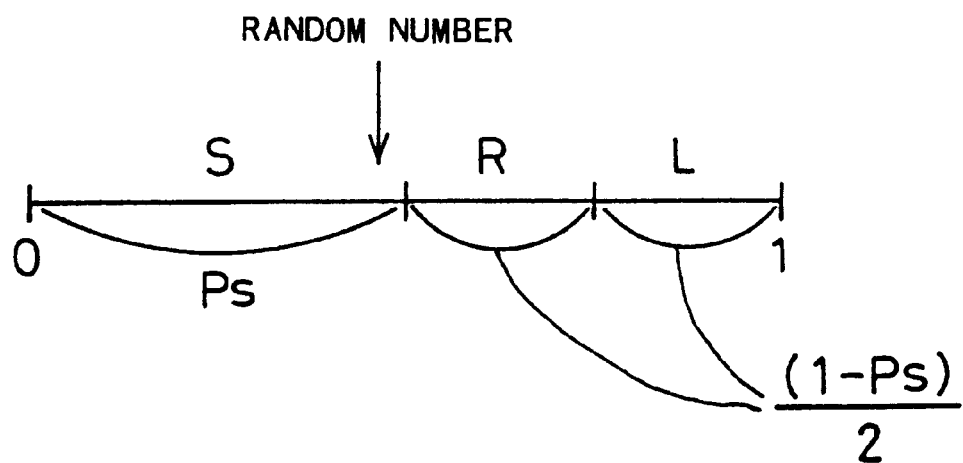
FIGS. 26(A) and 26(B) show a process of selecting a boundary condition and a process of selecting one among a plurality of available code strings.

FIG. 25 is a flowchart showing details of the fractal dimension transform of the chain code data executed at step S34 in the flowchart of FIG. 14. When the program enters the routine of FIG. 25, a code word of interest is extracted as an target to be processed from the original code string at step S41. A random number is then generated to select one of the three boundary conditions at step S42. FIG. 26(A) shows the procedure of selecting the boundary condition. The first control parameter Ps set at step S33 in the flowchart of FIG. 14 indicates a probability of selecting the boundary condition S representing a straight progress out of the three boundary conditions S, R, and L. In this embodiment, the probability of selecting the boundary condition R representing a right turn and that of selecting the boundary condition L representing a left turn are equal to each other and set equal to (1−Ps)/2. Accordingly, the total of the probabilities of selecting one of the three boundary conditions S, R, and L is equal to one. At step S42 in the flowchart of FIG. 25, a random number in a range from 0 to 1 is generated, and one boundary condition is selected according to the value of the random number as shown in FIG. 26(A).

Figure 26B:
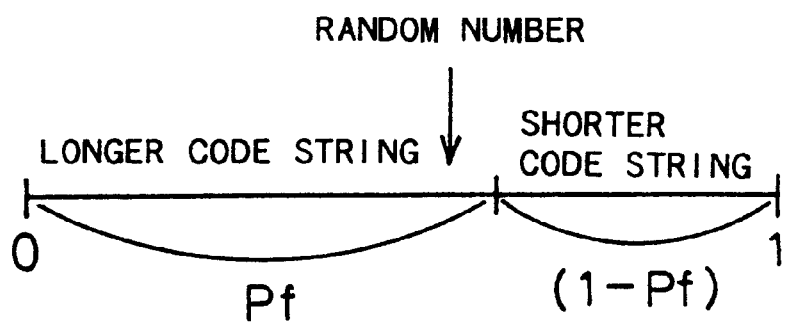

Another random number used for selecting one out of alternative code strings under the selected boundary condition is then generated at step S43. FIG. 26(B) shows the procedure of selecting one among the two available code strings under the same boundary condition. The second control parameter Pf set at step S33 in the flowchart of FIG. 14 represents a probability of selecting a longer code string among the two available code strings including a longer code string and a shorter code string. The total of the probabilities of selecting one of the two available code strings is equal to one. The reason why two code strings are shown in FIG. 26(B) as possible alternatives of selection is because there are at most two code strings transformed from one code word under any boundary conditions in the code books shown in FIGS. 21 through 23. At step S43 in the flowchart of FIG. 25, a random number in the range of 0 to 1 is generated, and either the longer code string or the shorter code string is selected according to the value of the random number as shown in FIG. 26(B). The condition for selecting one among the plural code strings given as the possible alternatives is hereinafter referred to as 'code string selection condition'.

When there are three or more code strings transformed from one code word of interest and given as the possible alternatives of selection under each boundary condition in the code books, the probabilities of selection are set corresponding to the number of the available code strings.

Referring back to the flowchart of FIG. 25, the processing at step S44 refers to one of the code books shown in FIGS. 21 through 23 according to the extracted code of interest, the boundary condition determined at step S42, and the condition for selecting a code string determined at step S43, and selects one code string. In case that there are no available substitute code strings corresponding to the boundary condition selected at step S42 in the code book (for example, in the case of the boundary condition R in FIG. 21), the program generates a random number again at step S44 and executes the processing of step S42 until an available substitute code string is present.

The following describes the role of the two control parameters Ps and Pf used at steps S42 through S44. As shown in FIGS. 26(A) and 26(B), a random number is used in transforming each code word of interest to a substitute code string. The two control parameters Ps and Pf here adjust the fractal dimension of the transformed line to a desired value. The fractal dimension is an index representing the degree of complexity of the line as mentioned previously. The higher fractal dimension gives a greater number of subtle fluctuations, whereas the lower fractal dimension gives a less number of subtle fluctuations- The mechanism of how the two control parameters Ps and Pf regulate the fractal dimension can be understood from the following discussions. The first control parameter Ps indicates the probability of selecting the boundary condition S representing a straight progress as shown in FIG. 26(A). Since the first control parameter Ps represents straightness of the transformed line, the larger control parameter Ps indicating the straightness results in the lower fractal dimension, while the smaller control parameter Ps results in the higher fractal dimension. The second control parameter Pf indicates the probability of selecting the more complicated code string among a plurality of available code strings as shown in FIG. 26(B). Since the second parameter Pf represents the complexity of the transformed line, the larger control parameter Pf indicating the complexity results in the higher fractal dimension, while the smaller control parameter Pf results in the lower fractal dimension.

Figure 27A:
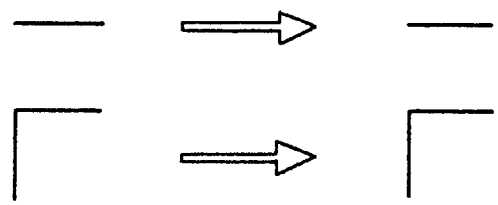
FIGS. 27(A) and 27(B) show the results of the processing when the parameter Ps representing the straightness is set equal to 1 and the parameter Pf representing the degree of complexity is set equal to 0.
Figure 27B:
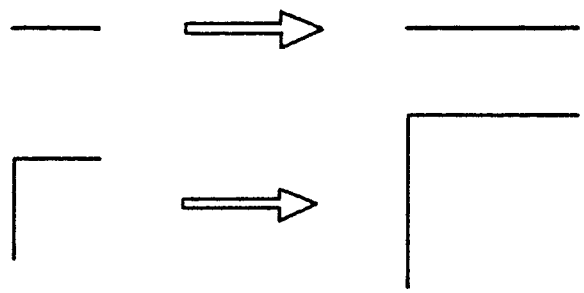

FIGS. 27(A) and 27(B) show the results of the processing when the control parameter Ps indicating the straightness is set equal to one and the control parameter Pf indicating the complexity is set equal to zero. Under the condition of Ps=1, the boundary condition S representing a straight progress is always selected. Under the condition of Pf=0, the shorter code string is always selected among the two available code strings. In this case, as clearly understood from the code books shown in FIGS. 21 through 23, the increased resolution keeps the original line unchanged (see FIG. 27(A)), and the magnification process simply doubles the original line while keeping the shape of the line unchanged (see FIG. 27(B)).

The degree of complexity of the line, that is, the fractal dimension, can be controlled by adjusting the values of the control parameter Ps representing the straightness and the control parameter Pf representing the degree of complexity. The selection probabilities of the three boundary conditions R, S, and L defined by the parameter Ps indicating the straightness (see FIG. 26(A)) correspond to the first selection probabilities in the claimed invention. The selection probabilities defined by the parameter Pf indicating the degree of complexity (see FIG. 26(B)) correspond to the second selection probabilities in the claimed invention. Instead of the selection probabilities based on one control parameter Ps representing the straightness, three selection probabilities for the three boundary conditions R, S, and L may be set as the first selection probabilities. In the same manner, selection probabilities of selecting one among three or more available code string may be set as the second selection probabilities. The processing using one control parameter Ps representing the straightness and one control parameter Pf representing the degree of complexity is, however, advantageous because the fractal dimension of the transformed digital line can be controlled readily with the only two control parameters Ps and Pf.

After the code word of interest is transformed to the selected code string, the program proceeds to step S45 in the flowchart of FIG. 25, at which the substitute code string thus selected is added to expanded code strings. The 'expanded code strings' here denote the chain code data obtained as a result of the fractal dimension transform and corresponds to the transformed chain code data in the claimed invention. The expanded code strings are stored in the code memory 84.

At subsequent step S46, it is judged whether or not the transforming process has been completed for all the code words included in the original code string. When not completed, the program returns to step S41 and repeats the processing of steps S41 through S45 described above. This procedure generates chain code data of a higher fractal dimension, which is obtained by increasing the fractal dimension of the digital line expressed by the original chain code data.

After the processing of step S34 shown in the flowchart of FIG. 25 is completed, the program goes to step S35 in the flowchart of FIG. 14, at which it is judged whether or not the processing has been completed for the specified number of transform cycles N. Namely the processing of step S34 is repeated by the specified number of transform cycles N. This procedure generates transformed chain code data representing a digital line of a higher fractal dimension, which is obtained by increasing the fractal dimension of the original digital line. In case that the resolution is enhanced by the increase in fractal dimension, the transformed chain code data thus obtained represents a high-resolution digital line having the resolution that is the N-th power of two of the resolution of the original digital line.

Figures 28A, 28B, 28C:
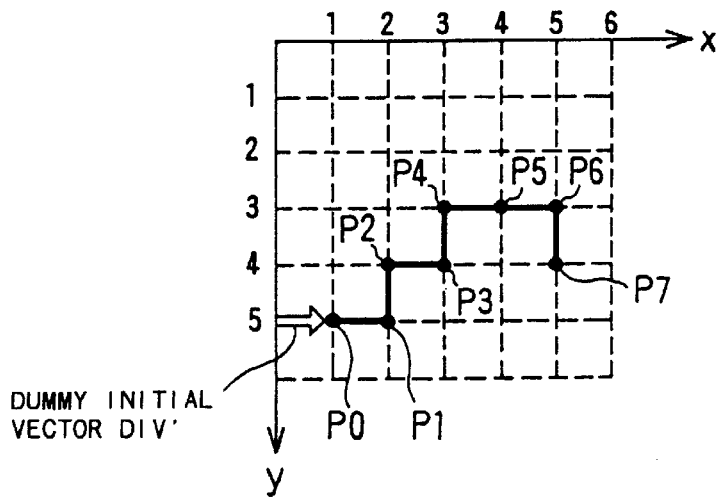
FIGS. 28(A)–28(C) show an exemplified process of decoding the chain code data.

At subsequent step S36, the transformed chain code data are decoded to generate digital line data representing a digital line of a higher fractal dimension. FIGS. 28(A)–28

(C) show an exemplified process of decoding the chain code data. As a matter of convenience, the chain code data 'slrlrsr' of the digital line shown in FIGS. 17(A) and 17(B) are decoded in this example. The point numbers P0 through P6 in the leftmost column and the code words in the second column in FIG. 28(A) are identical with those shown in FIG. 17(B). The chain coding/decoding rules (FIG. 28(B)) that are identical with those shown in FIG. 16(B) are used for decoding the chain code data. As shown in FIG. 17(A), the chain coding process sets the coordinates of the starting point P0 and the dummy initial vector DIV reaching the starting point P0 as the initial conditions. In a similar manner, the decoding process sets the coordinates of a starting point P0 and a dummy initial vector DIV' reaching the starting point P0 as the initial conditions (FIG. 28(C)).

With these initial conditions, the chain code data are decoded according to the chain coding/decoding rules shown in FIG. 28(B). Each code word is accordingly converted to an input vector and an output vector as shown in FIG. 28(A). Since both the input vector and the output vector for each code word are unit vectors, the coordinates of the respective points P1 through P6 can be calculated successively from the coordinates (1,5) of the starting point P0 and these unit vectors. By way of example, the first code word 's' gives an output vector going straight by a unit length in the same direction (directional value =0) as that of the input vector (or the dummy initial vector DIV') going to the starting point (1,5), and therefore the coordinates (2,5) are output as the coordinate values of the second point P1 (see the rightmost column in FIG. 28(A)). Since the input vector going to the second point P1 is identical with the output vector going from the starting point P0, the direction of the output vector going from the point P1 to the next point P2 can be determined by the code word 'l' for the point P1. In this manner, the coordinates of the respective points are successively determined according to the code string as shown in FIG. 28(C).

In the example of FIG. 28(C), the consecutive three points P4 through P6 are aligned on a straight line. In such a case, only the points P4 and P6 on both ends of the straight line may be output as the vertex points constituting the digital line.

Even if the original digital line is a closed line, the decoded digital line of a higher fractal dimension may not necessarily form a closed line. In this case, the resulting digital line of a higher fractal dimension would be corrected to join the starting point and the terminal point thereof.

Alternatively, the fractal dimension transform of the chain code data may be modified so that the starting point and the terminal point of the decoded digital line of a higher fractal dimension coincide with each other. FIGS. 29(A) and 29(B) illustrate a process of the modified fractal dimension transform, which corresponds to that of FIGS. 24(A) and 24(B) described previously. FIGS. 29(A) and 29(B) shows an example of enhancing the resolution by the fractal dimension transform.

The original code string shown in FIG. 29(A) is identical with that of FIG. 24(A). The transformed code string shown in FIG. 29(B) includes a non-transformed first code word 's' that is included in the original code string and the last code word 's' that represents a straight progress and is added to the end of the transformed code string. The first non-transformed code word is not restricted to the code word 's' representing a straight progress but may be any one of the three code words. The last code word added to the end of the transformed code string, on the other hand, should be the code word 's' representing a straight progress. As shown in FIG. 29(B), the resulting series of vectors expressed by the transformed code string always passes through all of the original points P0–P4. Namely the starting point P0 and the terminal point P4 of the digital line can be maintained at the original positions by setting the dummy initial vector DIV' and the coordinates of the starting point P0 equal to those prior to the transform in the decoding process. This procedure ensures that the transformed digital line of a higher fractal dimension forms a closed line when the original digital line is a closed line.

Figure 30A:
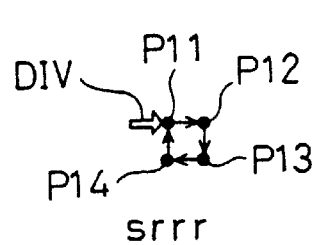
FIGS. 30(A)–30(D) show an example of expanding a digital line by the method of FIGS. 29(A) and 29(B)
Figure 30B:
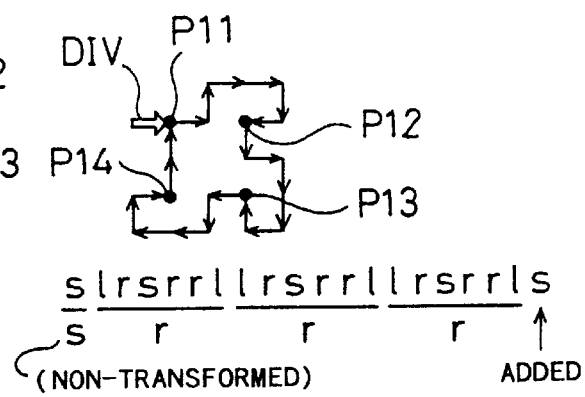
Figure 30C:
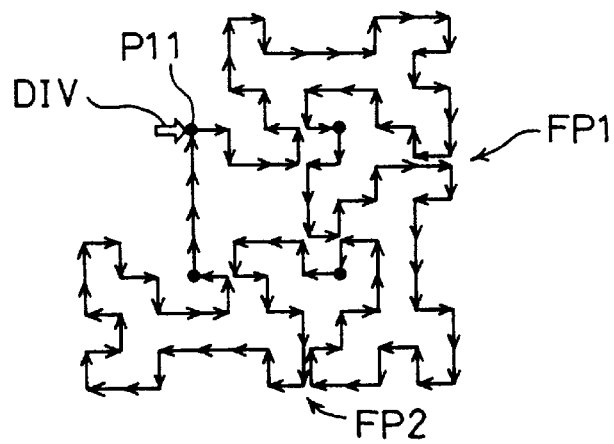

FIGS. 30(A)–30(D) show an example of expanding a digital line by the modified fractal dimension transform method of FIGS. 29(A) and 29(B). The chain code data representing an original digital line shown in FIG. 30(A) is 'srrr'. Chain code data representing a digital line shown in FIG. 30(B) is obtained by expanding the original digital line once. Here the transformed code string includes a non-transformed first code word 's' and the last code word 's' that represents a straight progress and is added to the end of the series. Chain code data representing a digital line shown in FIG. 30(C) is obtained by expanding the digital line of FIG. 30(B) again. In a similar manner, the transformed code string has a non-transformed first code word and the last code word 's' that represents a straight progress and is added to the end of the series. At every cycle of the expanding process (that is, at every fractal dimension transform), the first code word included in the code string is kept non-transformed, whereas the code word 's' representing a straight progress is added to the end of the code string. This procedure ensures that the digital line forms a closed line even after the transform of the fractal dimension.

Figure 30D:
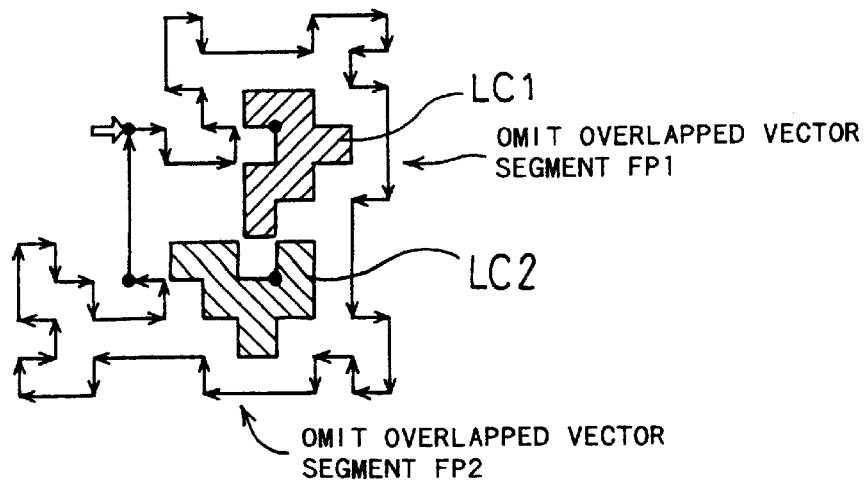

The series of vectors shown in FIG. 30(C) includes special portions FP1 and FP2 in each of which vectors having opposite directions exist on an identical line segment (hereinafter referred to as 'overlapped vector segments'). In the course of decoding the chain code data, one applicable procedure eliminates these overlapped vector segments FP1 and FP2 as well as closed lines related to the respective overlapped vector segments FP1 and FP2 (hereinafter referred to as 'local closed lines'). Namely, a first local closed line LC1 shown in FIG. 30(D) is eliminated along with the elimination of the first overlapped vector segment FP1, whereas a second local closed line LC2 is eliminated along with the elimination of the second overlapped vector segment FP2. The resulting line does not include an excessively complicated line portion and is preferable in some cases. In accordance with another embodiment, the digital line shown in FIG. 30(C) may be used without eliminating the overlapped vector segments and the related local closed lines as shown in FIG. 30(D). Still another embodiment may eliminate only the overlapped vector segments while leaving the local closed lines intact.

Referring back to the flowchart of FIG. 14, at step S37, the processed digital line thus obtained is output from the processed digital line storage unit 92 (FIG. 13). There are many modes of the output operation such as display of the digital line on the color CRT 70 and printing out of the digital line with the full color printer 72.

Figures 31A, 31B:
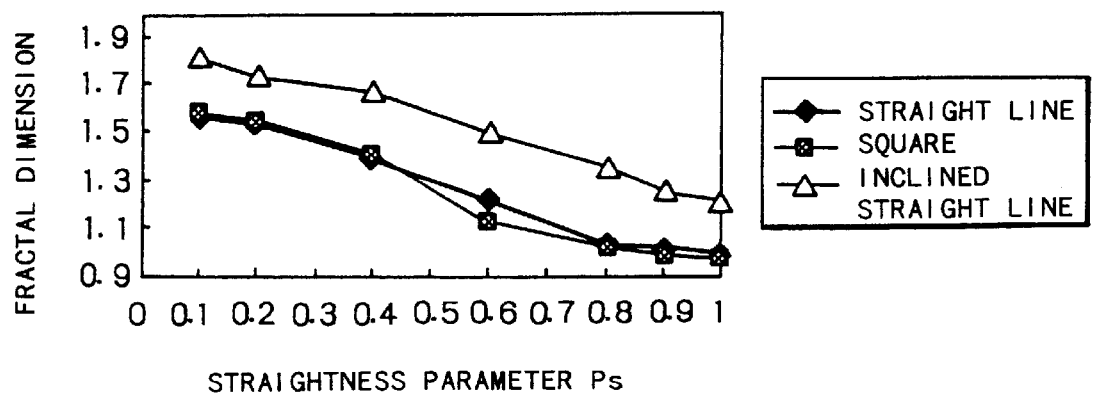
FIGS. 31(A) and 31(B) show the results of measurement of the fractal dimension regarding various figures processed in the embodiment.

FIGS. 31(A) and 31(B) show measured fractal dimensions regarding a variety of figures that have been obtained by the fractal dimension transform in the embodiment. Measurement of the fractal dimension was executed by the box counting method described previously with the drawing of FIG. 4. The fractal dimension transform of each figure was carried out with respect to various values of the control parameter Ps representing the straightness while using a fixed value of 0.9 for the control parameter Pf representing the complexity and a constant value of 3 for the number of transforming cycles N. The leftmost column in FIG. 31(A) shows the values set to the control parameter Ps representing the straightness, and the second column shows the fractal dimension obtained by executing the fractal dimension transform on a horizontal straight line. The third column and the rightmost column respectively show the fractal dimensions obtained by executing the fractal dimension transform on a square and a 45°-inclined straight line. FIG. 31(B) is a graph showing the results of FIG. 31(A).

As clearly understood from the graph of FIG. 31(B), there is a substantially linear negative correlation between the control parameter Ps representing the straightness and the fractal dimension. On the contrary, there is a substantially linear positive correction between the control parameter Pf representing the complexity and the fractal dimension. This proves that the fractal dimension can be regulated by these two control parameters Ps and Pf. The fractal dimension thus obtained has a relatively high value in the range of 1.0 to 1.8. The fractal dimension of a two-dimensional line figure on a plane has a theoretical critical value of 2.0 for the fractal dimension. The results of measurement of the fractal dimension are relatively high and close to this theoretical critical value. Namely, the fractal processing according to this embodiment can advantageously set the fractal dimension of a digital line to a relatively high value.

In another preferred embodiment, the fractal dimension of typical lines may be measured in advance for every combination of the number of transforming cycles N of the fractal dimension transform (that is, the number of repetitions of the recursive transforming process) with the two control parameters Ps and Pf. The fractal dimension of the transformed lines can be estimated according to the number of transforming cycles N and the two control parameters Ps and Pf based on such measurement data. For example, if the number of transforming cycles is input, the values of the two control parameters Ps and Pf that attain a desired fractal dimension can be determined from the relationship between the two control parameters Ps and Pf and the fractal dimension as shown in FIG. 31(B).

In measuring fractal dimensions for typical lines (or fundamental lines), at least two straight lines having different directions are preferably used as the typical lines. By way of example, a horizontal straight line and a 45°-inclined straight line may be used as the typical lines for the measurement. This allows an arbitrary digital line to be regarded as a combination of these typical lines and thus enables estimation of the fractal dimension of the transformed digital line.

FIGS. 32(A) and 32(B1)–32(B3) show the estimation of the fractal dimension. The original digital line is a 45°-inclined square. The digital lines shown in FIGS. 32(B1) through 32(B3) are obtained while the control parameter Ps representing the straightness is set equal to 0.885, 0.635, and 0.375, respectively. FIG. 32(A) shows the estimated values and the observed values of the fractal dimension Fdim. As clearly understood from these data, the estimated values and the observed values of the fractal dimension Fdim well agree with each other.

As described above, this embodiment of the fractal processing converts a digital line to rls code data and subsequently transforms each code word of the rls code data to a substantially equivalent code string, thereby increasing the fractal dimension of the digital line. This processing gives natural fluctuations in enhancing the resolution of the digital line or expanding the digital line. Especially, since the above fractral processing refers to the code books that have been prepared in advance to transform each code word to a code string, a high-speed transform can be achieved without any complicated arithmetic operations. Another advantage of this embodiment is that a digital line having a desired fractal dimension can be obtained simply by adjusting the two control parameters Ps and Pf.

C-3. Details of Chain Coding Process

Figure 33:
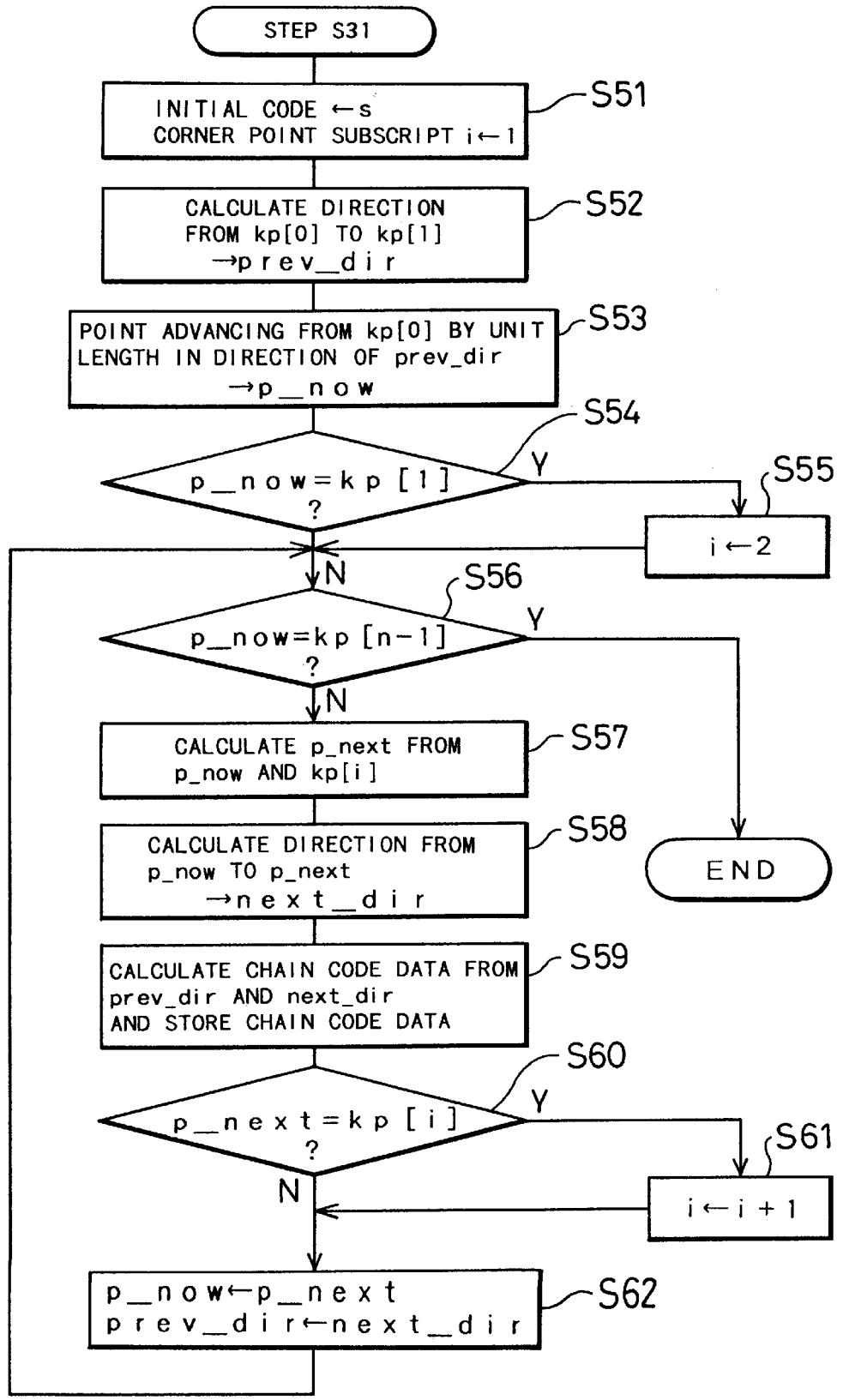
FIG. 33 is a flowchart showing details of the chain coding process of a digital line executed at step S31 in the flowchart of FIG. 14.

FIG. 33 is a flowchart showing details of the chain coding process of a digital line executed at step S31 in the flowchart of FIG. 14. In the description below, it is assumed that a digital line consists of an array of n points and the respective points are referred to as 'corner points'. The symbols used in FIG. 33 are defined as follows:

kp[i] (i=0 to n−1): coordinates of n corner points constituting the digital line;

p_now: coordinates of a current point;

p_next: coordinates of a next point advancing from the current point p_now by a unit length;

prev_dir: directional value representing a direction of an input vector going to the current point; and next_dir: directional value representing a direction of an output vector going from the current point.

The relationship between the directions and the directional values prev_dir and next_dir follows FIG. 16(A) described above.

When the program enters the routine of FIG. 33, at step S51, the code word 's' representing a straight progress is set as the initial code word, and a subscript 'i' indicating an ordinal number of a corner point is set equal to 1. At subsequent step S52, the directional value prev_dir is calculated from the coordinates kp[0] of a starting point and the coordinates kp[1] of a next point. The directional value prev_dir can be obtained from the values of an x-component $\Delta x$ and a y-component $\Delta y$ of coordinate differences (kp[1]−kp[0])=($\Delta x, \Delta y$). Since each line segment of a digital line is parallel to either an x- or a y-axis, one of the components $\Delta x$ and $\Delta y$ is equal to zero. The directional value prev_dir representing a direction going from the starting point to the next point is thus determined from whether the sign of the non-zero component of the differences $\Delta x$ and $\Delta y$ is positive or negative. For example, in case that $\Delta x=0$ and $0<\Delta y$, prev_dir=1. In case that $\Delta x=0$ and $0>\Delta y$, prev_dir=3.

At step S53, coordinates of the current point p_now is set to be of the point advancing from the coordinates kp[0] of the starting point by a unit length in the direction expressed by the directional value prev_dir. It is then judged at step S54 whether or not the coordinates of the current point p_now are identical with the coordinates of the second corner point kp[1]. When they are, the program proceeds to step S55 to set the subscript 'i' indicating a corner point equal to 2. This is because the subsequent arithmetic operations are carried out with the current point p_now and the next corner point kp[i].

It is judged at step S56 whether or not the current point p_now coincides with a terminal point kp[n−1]. When yes, the program exits from this routine. If the original digital line to be processed is a closed line, the terminal point is identical with the starting point. In order to cope with this case, it is judged at step S56 whether or not the current point p_now coincides with the starting point kp[0].

Figure 34:
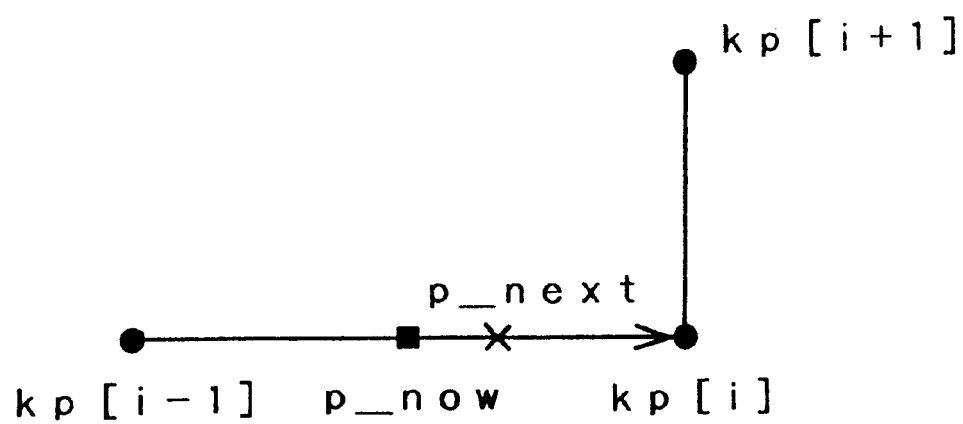
FIG. 34 shows a process of determining the next point $p_{13}$next from the current point p__now.

When the current point does not coincide with the terminal point at step S56, the program proceeds to step S57 to determine a position of the next point p_next advancing from the current point p_now by a unit length in the direction of the next corner point kp[i], based on the current point p_now and the next corner point kp[i]. FIG. 34 shows a process of determining the next point p_next from the current point p_ now. Since the respective corner points kp[i] are vertex points of the digital line, a line segment joining the corner points kp[i] runs either in the horizontal direction or in the vertical direction. The current point p_now and the next point p_next are set on a line segment joining the two adjoining corner points kp [i−1] and kp [i], and are thereby aligned in either the horizontal direction or the vertical direction.

The directional value next_dir of the output vector going from the current point p_now to the next point p_next is then calculated at step S58. The directional value next_dir is calculated from the difference between the coordinate value p_next of the next point and the coordinate value p_now of the current point in the same manner as the processing of step S52 described above. At subsequent step S59, chain code data are obtained according to the rules shown in FIG. 16(B), based on the directional value prev_dir of the input vector going to the current point p_now and the directional value next_dir of the output vector going from the current point p_now, and are stored into the code memory 84.

It is then judged at step S60 whether or not the next point p_next coincides with the next corner point kp[i]. When yes, the program proceeds to step S61 to increase the subscript 'i' indicating the ordinal number of the corner point by one. At subsequent step S62, the coordinate values of the current point p_now are substituted by the coordinate values of the next point p_next, and the directional value prev_dir of the input vector going to the current point is substituted by the directional value next_dir of the output vector going from the current point. The point of interest is accordingly advanced by one. The program then returns from step S62 to step S56 and repeats the processing of steps S56 through S62 until the current point p_now reaches to the last corner point kp[n−1]. This procedure enables the digital line consisting of the corner points kp[i] to be converted to chain code data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of correcting an image boundary, said method comprising the steps of:
   (a) providing an image mask data representing an image boundary to be used to define an image object;
   (b) specifying only part of said image boundary as a target boundary portion to be processed;
   (c) carrying out a fractal processing on said target boundary portion to enhance fractal dimensions of said target boundary portion, thereby obtaining a corrected image boundary; and
   (d) carrying out a specific image processing on said image object while determining a shape of said image object by said corrected image boundary.

2. A method in accordance with claim 1, wherein
one cycle of said fractal processing magnifies said target boundary portion by a factor of M; and wherein
said step (c) comprises the steps of:
   contracting said target boundary portion to $1/M^N$ while maintaining the size of the non-target boundary portion of said image boundary, where N is an integer of at least 1; and
   recursively executing the fractal processing by N times for said contracted target boundary portion; and
   connecting said corrected target boundary portion after said fractal processing with said non-target boundary portion to obtain said corrected image boundary.

3. A method in accordance with claim 2, wherein said factor M is equal to 2.

4. A method in accordance with claim 1, wherein
said step (d) comprises the step of: generating said image object having a plurality of uniform-density areas where each pair of said uniform-density areas are divided by said corrected boundary portion and filling said plurality of uniform-density areas with different densities, respectively.

5. A method in accordance with claim 1, wherein
said step (d) comprises the steps of
   providing two image objects overlapping partly with each other across said image boundary; and
   reshaping two image objects by said corrected boundary to make said two image objects to contact each other across said corrected boundary.

6. A method in accordance with claim 1, wherein
said target boundary portion is a digital line consisting of a plurality of line segments each parallel to one of a plurality of coordinate axes; and wherein
said fractal processing comprises the steps of:
   converting digital line data representing the digital line to chain code data including a plurality of code words each selected from three basic code words representing a right turn, a straight progress, and a left turn, respectively;
   transforming each code word included in the chain code data according to a predetermined transform rule into a code string including at least one code word, thereby generating transformed chain code data including a plurality of said code strings, wherein each code string after the transform is made so that a pre-selected one of a starting vector and a terminal vector in a series of vectors expressed by the code string after the transform at least partly overlaps a pre-selected one of a first-half vector and a second-half vector of a pair of vectors expressed by each code word before the transform; and
   decoding the transformed chain code data to generate transformed digital line data representing a transformed digital line having a higher fractal dimension than that of said digital line.

7. A method in accordance with claim 6, wherein
said transform rule comprises a rule of substituting each of said three basic code words included in the chain code data with a code string according to three boundary conditions indicative of a right turn, a straight progress, and a left turn; and wherein
said step of generating the transformed chain code data comprises the steps of:
   (1) selecting one of the three boundary conditions with respect to each code word to be transformed; and
   (2) transforming each code word to a code string according to the transform rule under the selected boundary condition.

8. A method in accordance with claim 7, further comprising the step of:
   specifying a first selection probability for selecting one of the three boundary conditions; and wherein
   said step (2) comprises the step of:
      (i) selecting one of the three boundary conditions according to the first selection probability.

9. A method in accordance with claim 8, wherein the transform rule comprises a rule including a plurality of available code strings to be transformed from one code word under one boundary condition; and wherein said method further comprises the step of:

when said plurality of available code strings are to be transformed from one code word according to the transform rule, specifying a second selection probability for selecting one of the plurality of available code strings; and wherein said step (i) comprises the step of:

when said plurality of available code strings are to be transformed from one code word according to the transform rule, selecting one of the plurality of available code strings according to the second selection probability.

10. A method in accordance with claim 9, wherein said step of generating the transformed chain code data comprises the steps of:

maintaining a front-end code in the chain code data unchanged; and adding a predetermined code word to an back-end of the transformed chain code data.

11. A method in accordance with claim 10, further comprising the step of:

recursively executing said step of generating the transformed chain code data by a desired times.

12. A method in accordance with claim 11, further comprising the steps of:

measuring fractal dimensions of fundamental lines which are transformed according to the fractal processing with various combinations of the number of repetitions of said step of generating the transformed chain code data and said first and second selection probabilities;

storing relationship between the measured fractal dimensions, the number of repetitions, and said first and second selection probabilities;

specifying the number of repetitions and a desired fractal dimension prior to said step of generating the transformed chain code data; and setting the first and second selection probabilities prior to the step of generating the transformed chain code data so that the desired fractal dimension is be attained by the specified number of repetitions according to said relationship between the fractal dimension, the number of repetitions, and the first and second selection probabilities.

13. An apparatus for correcting an image boundary, said apparatus comprising:

means for providing an image mask data representing an image boundary to be used to define an image object;

extraction means for extracting only part of said image boundary as a target boundary portion to be processed;

boundary correction means for carrying out a fractal processing on said target boundary portion, thereby obtaining a corrected image boundary; and means for carrying out a specific image processing on said image object while determining a share of said image object by said corrected image boundary.

14. A method of processing a digital line consisting of a plurality of line segments each parallel to one of a plurality of coordinate axes; said method comprising the steps of:

converting digital line data representing the digital line to chain code data including a plurality of code words each selected from three basic code words representing a right turn, a straight progress, and a left turn, respectively;

transforming each code word included in the chain code data according to a predetermined transform rule into a code string including at least one code word, thereby generating transformed chain code data including a plurality of said code strings, wherein each code string after the transform is made so that a pre-selected one of a starting vector and a terminal vector in a series of vectors expressed by the code string after the transform at least partly overlaps a pre-selected one of a first-half vector and a second-half vector of a pair of vectors expressed by each code word before the transform; and decoding the transformed chain code data to generate transformed digital line data representing a transformed digital line having a higher fractal dimension than that of said digital line.

15. An apparatus for processing a digital line consisting of a plurality of line segments each parallel to one of a plurality of coordinate axes; said apparatus comprising:

coding means for converting digital line data representing the digital line to chain code data including a plurality of code words each selected from three basic code words representing a right turn, a straight progress, and a left turn, respectively;

transforming means for transforming each code word included in the chain code data according to a predetermined transform rule into a code string including at least one code word, thereby generating transformed chain code data including a plurality of said code strings, wherein each code string after the transform is made so that a pre-selected one of a starting vector and a terminal vector in a series of vectors expressed by the code string after the transform at least partly overlaps a pre-selected one of a first-half vector and a second-half vector of a pair of vectors expressed by each code word before the transform; and decoding means for decoding the transformed chain code data to generate transformed digital line data representing a transformed digital line having a higher fractal dimension than that of said digital line.

16. A computer program product stored on a computer readable medium for correcting an image boundary, said computer program product comprising:

first program code for providing an image mask data representing an image boundary to be used to define an image object;

second program code for causing a computer to extract part of said image boundary as a target boundary portion to be processed;

third program code for causing said computer to carry out a fractal processing for said target boundary portion, thereby yielding a corrected image boundary; and fourth program code for carrying out a specific image processing on said image object while determining a shape of said image object by said corrected image boundary.

17. A computer program product stored on a computer readable medium for processing a digital line consisting of a plurality of line segments each parallel to one of a plurality of coordinate axes; said computer program product comprising:

first program code means for causing a computer to convert digital line data representing the digital line to chain code data including a plurality of code words each selected from three basic code words representing a right turn, a straight progress, and a left turn, respectively;

second program code means for causing the computer to transform each code word included in the chain code data according to a predetermined transform rule into a code string including at least one code word, thereby generating transformed chain code data including a plurality of said code strings, wherein each code string after the transform is made so that a pre-selected one of a starting vector and a terminal vector in a series of vectors expressed by the code string after the transform at least partly overlaps a pre-selected one of a first-half vector and a second-half vector of a pair of vectors expressed by each code word before the transform; and third program code means for causing the computer to decode the transformed chain code data to generate transformed digital line data representing a transformed digital line having a higher fractal dimension than that of said digital line.

* * * * *